(12) United States Patent
Terui et al.

(10) Patent No.: US 8,804,310 B2
(45) Date of Patent: Aug. 12, 2014

(54) ELECTROCHEMICAL DEVICE

(75) Inventors: Toshiya Terui, Takasaki (JP); Tomofumi Akiba, Takasaki (JP); Katsuei Ishida, Takasaki (JP); Naoto Hagiwara, Takasaki (JP); Satoshi Nagura, Ueda (JP); Shin Nakagawa, Ueda (JP); Tomohiro Taguchi, Ueda (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 215 days.

(21) Appl. No.: 13/383,411

(22) PCT Filed: Jun. 3, 2010

(86) PCT No.: PCT/JP2010/059410
§ 371 (c)(1),
(2), (4) Date: Jan. 10, 2012

(87) PCT Pub. No.: WO2011/007624
PCT Pub. Date: Jan. 20, 2011

(65) Prior Publication Data
US 2012/0113566 A1  May 10, 2012

(30) Foreign Application Priority Data

Jul. 17, 2009  (JP) ................................. 2009-169290
Mar. 29, 2010  (JP) ................................. 2010-075347

(51) Int. Cl.
| H01G 9/00 | (2006.01) |
| H01G 9/008 | (2006.01) |
| H01G 9/04 | (2006.01) |
| H01G 11/66 | (2013.01) |
| H01G 11/74 | (2013.01) |
| H01G 11/70 | (2013.01) |
| H01G 11/52 | (2013.01) |
| H01G 9/02 | (2006.01) |
| H01M 10/04 | (2006.01) |
| H01G 11/28 | (2013.01) |

(52) U.S. Cl.
CPC ............... *H01G 9/016* (2013.01); *H01G 9/058* (2013.01); *Y02E 60/13* (2013.01); *H01G 11/66* (2013.01); *H01G 11/74* (2013.01); *H01G 11/70* (2013.01); *H01G 11/52* (2013.01); *Y02E 60/12* (2013.01); *H01G 9/02* (2013.01); *H01M 10/04* (2013.10); *H01G 11/28* (2013.01)
USPC ........................................................ 361/502

(58) Field of Classification Search
CPC ....... H01G 11/74; H01G 11/66; H01G 11/52; H01G 11/28; H01G 11/72; H01G 9/02; H01G 9/058; H01G 11/70
USPC ........................................................ 361/502
See application file for complete search history.

(56) References Cited

U.S. PATENT DOCUMENTS

| 4,761,352 | A | * | 8/1988 | Bakos et al. | ..................... 429/94 |
| 5,115,378 | A | | 5/1992 | Tsuchiya et al. | |
| 5,460,904 | A | * | 10/1995 | Gozdz et al. | .................. 429/316 |
| 6,181,545 | B1 | * | 1/2001 | Amatucci et al. | ............. 361/502 |
| 6,631,072 | B1 | | 10/2003 | Paul et al. | |
| 7,251,122 | B2 | * | 7/2007 | Hinoki et al. | ................. 361/502 |
| 7,629,077 | B2 | * | 12/2009 | Bowles et al. | ................ 429/136 |
| 8,105,714 | B2 | * | 1/2012 | Schmidt et al. | .............. 429/209 |
| 2003/0172509 | A1 | | 9/2003 | Maletin et al. | |
| 2003/0186117 | A1 | * | 10/2003 | Shokoohi et al. | ............. 429/162 |
| 2005/0219799 | A1 | | 10/2005 | Paul et al. | |
| 2008/0020279 | A1 | * | 1/2008 | Schmidt et al. | ............... 429/221 |

FOREIGN PATENT DOCUMENTS

| CN | 1024060 C | 3/1994 |
| JP | H8-064479 A1 | 3/1996 |
| JP | 2000-353643 A | 12/2000 |
| JP | 2001-338848 A | 12/2001 |
| JP | 2002-015954 A1 | 1/2002 |
| JP | 2002-043180 A | 2/2002 |
| JP | 2003-508906 A | 3/2003 |
| JP | 2006-054119 A | 2/2006 |
| JP | 2007-173865 A | 7/2007 |
| JP | 2007-299855 A | 11/2007 |
| JP | 2008-047397 A | 2/2008 |

OTHER PUBLICATIONS

Notification of First Office Action issued by Patent Office of the People's Republic of China, mailed Apr. 2, 2013, for Chinese counterpart application No. 201080029005.7.

Notice of Reasons for Refusal issued by Japanese Patent Office, mailed Jul. 3, 2013, for Japanese counterpart application No. 2012-095311 (a divisional application of Japanese application No. 2010-075347).
A Notification of Examination Opinions with Search Report issued by Taiwan Intellectual Property Office, mailed Aug. 16, 2013, for Taiwan counterpart application No. 099123573.
Notification of Reasons for Refusal issued by Korean Patent Office, mailed Oct. 16, 2012, for Korean counterpart application No. 10-2011-7027079.
Notice of Reasons for Refusal issued by Japanese Patent Office, mailed Apr. 24, 2013, for Japanese counterpart application No. 2012-095311.
International Preliminary Report, mailed Feb. 16, 2012, with Written Opinion of The International Searching Authority for Corresponding International Patent Application No. PCT/JP2010/059410, mailed Aug. 10, 2010.
Notice of Reasons for Refusal issued by Japanese Patent Office, mailed Oct. 2, 2013, for Japanese counterpart application No. 2012-095311 (a divisional application of Japanese application No. 2010-075347).

* cited by examiner

*Primary Examiner* — David M Sinclair

(74) *Attorney, Agent, or Firm* — Law Office of Katsuhiro Arai

(57) ABSTRACT

Provided is an electrochemical device which is capable of suppressing problems affecting the capacitor element as a whole, such as a drop in its voltage resistance characteristics and shortening of its life. The capacitor element (10) is constituted of a laminate formed by superposition of a first electrode sheet (11), a separation sheet (14), a second electrode sheet (12), a separation sheet (14), and a third electrode sheet (13) in the named order from the bottom, and folding the laminate along a reference line VSL to double the laminate. In the resulting folded laminate, a collector electrode layer (11*a*) and polarizable electrode layer (11*b*) of the first electrode sheet (11), the collector electrode layer (12*a*) and polarizable electrode layer (12*b*) of the second electrode sheet (12), the collector electrode (13*a*) and polarizable electrode layer (13*b*) of the third electrode sheet (13), and the two separation sheets (14) are connected to each other at the respective folded locations.

9 Claims, 21 Drawing Sheets

ELECTROCHEMICAL DEVICE

This application is the U.S. National Phase under 35 U.S.C. §371 of International Application PCT/JP2010/059410, filed on Jun. 3, 2010, which claims priority to Japanese Patent Application No. 2009-169290, filed on Jul. 17, 2009 and Japanese Patent Application No. 2010-075347, filed on Mar. 29, 2010. The International Application was published under PCT Article 21(2) in a language other than English.

TECHNICAL FIELD

The present invention relates to an electrochemical device structured in such a way that a capacitor element is sealed in a package.

PRIOR ART

A capacitor element used in an electric double-layer capacitor, which is a representative example of this type of electrochemical device, generally has a layer structure constituted by a collector electrode layer, a polarizable electrode layer, a separation sheet, a polarizable electrode layer, a collector electrode layer, a collector electrode layer, a polarizable electrode layer, a separation sheet, a polarizable electrode layer, and a collector electrode layer stacked on top of each other in this order (refer to Patent Literature 1). In other words, a set of collector electrode layer, polarizable electrode layer, separation sheet, polarizable electrode layer and collector electrode layer constitutes one charge/discharge cell, meaning that such capacitor element can be expressed by an equivalent circuit where multiple charge/discharge cells are electrically connected in parallel with a pair of leads.

With such an electric double-layer capacitor, applying voltage to the capacitor element generates an electric field according to the voltage, and lines of electric force generate according to the electric field. These lines of electric force gather at the edges of each polarizable electrode layer, so the density of lines of electric force at each of these edges becomes higher than in other locations. Also because lines of electric force are directed from the positive electrode toward the negative electrode, in a situation where, for example, a polarizable electrode layer on the positive electrode side is positioned at the outermost point and a polarizable electrode layer on the negative electrode side is positioned on the inside of the former, the highest density of lines of electric force appears at the edges of these polarizable electrode layers.

In other words, a capacitor element having the aforementioned layer structure is vulnerable to breakage and other damage due to high density of lines of electric force at the edges of each polarizable electrode layer, and because of this damage it presents the risk of problems affecting the capacitor element as a whole, such as a drop in its voltage resistance characteristics and shortening of its life.

Patent Literature 2 discloses a capacitor element for an electric double-layer capacitor having a collector electrode layer folded into the shape of the letter U, but since the two polarizable electrode layers formed in the collector electrode layer are separate, it is still difficult to avoid the aforementioned problems even when this capacitor element is used.

Although specific explanation is omitted, it goes without saying that problems similar to those mentioned above also affect lithium ion capacitors, redox capacitors, lithium ion batteries and other electrochemical devices having a capacitor element whose structure is roughly the same as the aforementioned capacitor element for an electric double-layer capacitor.

PRIOR ART LITERATURES

Patent Literatures

Patent Literature 1: Japanese Patent Laid-open No. 2002-015954
Patent Literature 2: Japanese Patent Laid-open No. Hei 08-064479

SUMMARY OF THE INVENTION

Problems to be Solved by the Invention

The object of the present invention is to provide an electrochemical device capable of reliably suppressing problems affecting the capacitor element as a whole, such as a drop in its voltage resistance characteristics and shortening of its life.

Means for Solving the Problems

To achieve the aforementioned object, the present invention provides an electrochemical device having a structure wherein a capacitor element is sealed in a package, said capacitor element having a configuration in which two or more electrode sheets, each having a collector electrode layer and a polarizable electrode layer formed on at least one side of the collector electrode layer, are stacked on top of each other to form a laminate with a separation sheet inserted between the polarizable electrode layers, said laminate being folded along a reference line, to be superposed, wherein each of the collector electrode layer and polarizable electrode layer constituting each electrode sheet, and the separation sheet, is continuous through the respective folded locations.

According to this electrochemical device, the capacitor element has a configuration in which stacked layers are folded along the reference line and superposed, while the collector electrode layer and polarizable electrode layer constituting each electrode sheet, and the separation sheet, are connected to each other at the respective folded locations, and therefore even though the layer structure in section view is the same as that of the conventional capacitor element, the edge areas in each polarizable electrode layer can be reduced compared to the conventional capacitor element.

In other words, while the conventional capacitor element is vulnerable to breakage and other damage due to higher density of lines of electric force at the edges of each polarizable electrode layer when voltage is applied to the capacitor element, and therefore presents the risk of problems affecting the capacitor element as a whole, such as a drop in its voltage resistance characteristics and shortening of its life caused by the damage, the aforementioned capacitor element has fewer edge areas in each polarizable electrode layer compared to the conventional capacitor element and can therefore effectively suppress the aforementioned damage and reliably suppress problems affecting the capacitor element as a whole, such as a drop in its voltage resistance characteristics and shortening of its life caused by such damage.

Effects of the Invention

According to the present invention, an electrochemical device capable of suppressing problems affecting the capacitor element as a whole, such as a drop in its voltage resistance characteristics and shortening of its life, can be provided.

The aforementioned object and other objects, constitution/features and operation/effects of the present invention are revealed by the explanations given below as well as the attached drawings.

MODE FOR CARRYING OUT THE INVENTION

First Embodiment

FIGS. 1 to 15 show an embodiment where the present invention is applied to an electric double-layer capacitor. This electric double-layer capacitor has a capacitor element 10, a pair of leads 20 connected to the capacitor element 10, and a package 30 in which the capacitor element 10 is sealed in a manner partially exposing the pair of leads 20.

Note that, in the following explanations, the direction toward the viewer, away from the viewer, right, left, bottom and top in FIG. 1 (A) are referred to as top, bottom, front, rear, left and right, respectively, while the corresponding directions in other drawings are also referred to as top, bottom, front, rear, left and right, respectively, for the convenience of explanation.

First, FIGS. 2 to 9 are used to explain the constitution of, and method for creating, the capacitor element 10.

Figure 2:
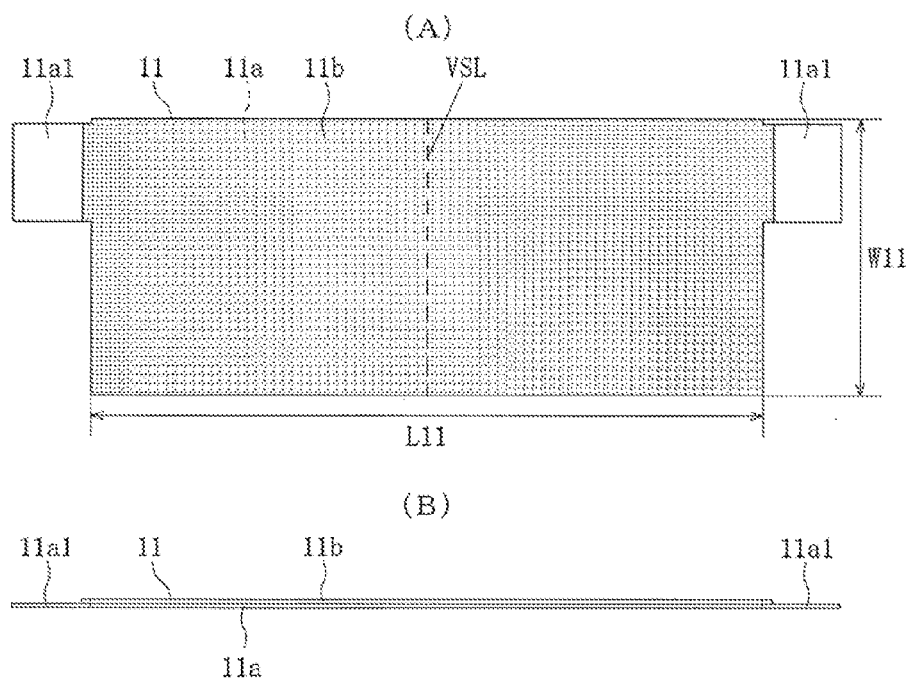
FIG. 2 (A) is a top view of a first electrode sheet, while FIG. 2 (B) is a left side view of the same.
Figure 3:
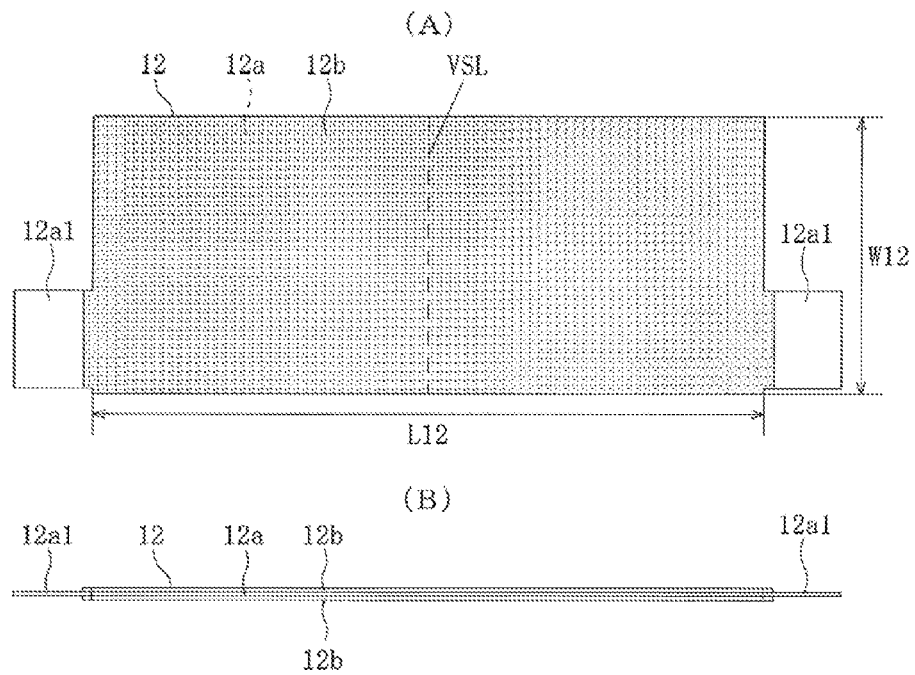
FIG. 3 (A) is a top view of a second electrode sheet, while FIG. 3 (B) is a left side view of the same.
Figure 4:
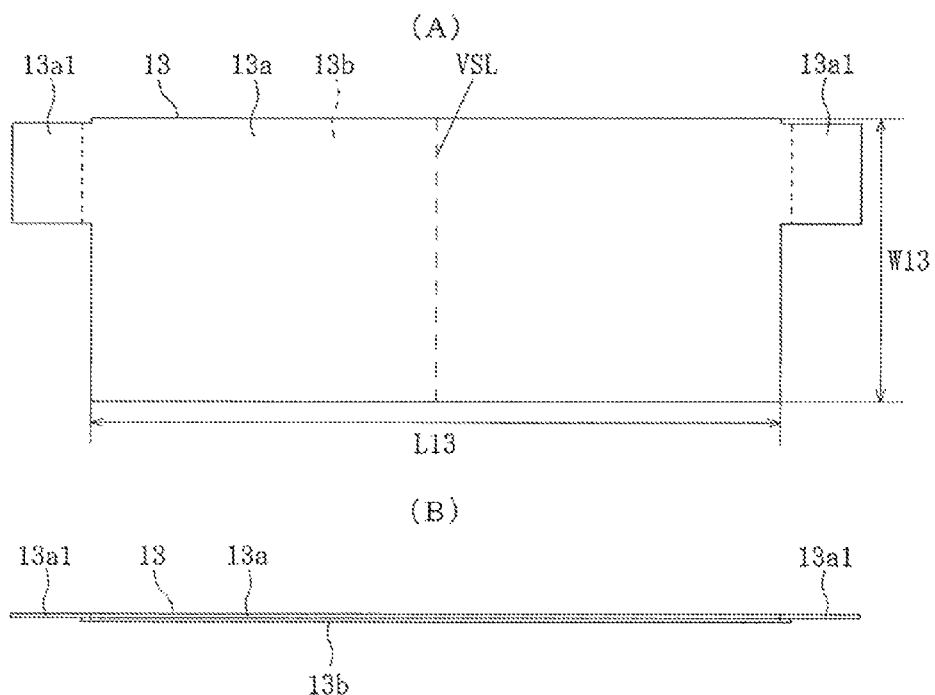
FIG. 4 (A) is a top view of a third electrode sheet, while FIG. 4 (B) is a left side view of the same.
Figure 5:
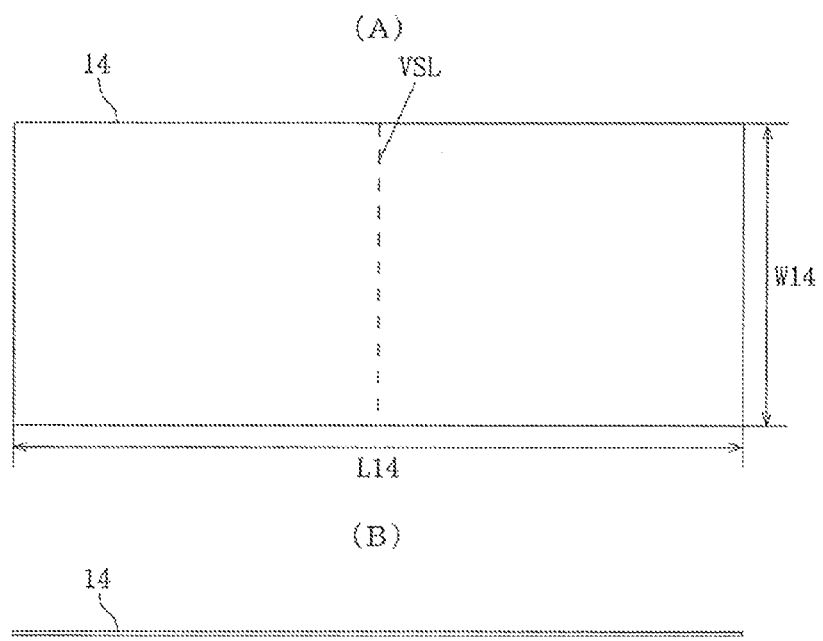
FIG. 5 (A) is a top view of a separation sheet, while FIG. 5 (B) is a left side view of the same.

To create the capacitor element 10, a first electrode sheet 11 shown in FIGS. 2 (A) and (B), a second electrode sheet 12 shown in FIGS. 3 (A) and (B), a third electrode sheet 13 shown in FIGS. 4 (A) and (B), and a separation sheet 14 shown in FIGS. 5 (A) and (B) are prepared.

As shown in FIGS. 2 (A) and (B), the first electrode sheet 11 has a rectangular collector electrode layer 11a of specified longitudinal dimension L11 and lateral dimension W11, as well as a polarizable electrode layer 11b formed over the entire top surface of the collector electrode layer 11a by means of coating, etc. (note that, in the drawings, the front edge and rear edge of the polarizable electrode layer 11b are slightly overlapping each lead connection part 11a1). The collector electrode layer 11a is made of aluminum, platinum or other conductive material, and its thickness is 5 to 50 μm. The polarizable electrode layer 11b is made of PAS (polyacene-based organic semiconductor), active carbon or other active material, and its thickness is 10 to 50 μm. Also, a rectangular lead connection part 11a1 is provided on the right side of the collector electrode layer 11a on both ends in the longitudinal direction in a manner integral with, and at the same thickness as, the collector electrode layer 11a.

As shown in FIGS. 3 (A) and (B), the second electrode sheet 12 has a rectangular collector electrode layer 12a of longitudinal dimension L12 identical to longitudinal dimension L11 mentioned above, and lateral dimension W12 identical to lateral dimension W11 mentioned above, as well as polarizable electrode layers 12b formed over the entire top surface and entire bottom surface of the collector electrode layer 12a by means of coating, etc. (note that, in the drawings, the front edge and rear edge of the polarizable electrode layer 12b are slightly overlapping each lead connection part 12a1). The material and thickness of the collector electrode layer 12a are the same as those of the aforementioned collector electrode layer 11a, while the material and thickness of each polarizable electrode layer 12b are the same as those of the aforementioned polarizable electrode layer 11b. Also, a lead connection part 12a1 having the same shape as the aforementioned lead connection part 11a1 is provided on the left side of the collector electrode layer 12a on both ends in the longitudinal direction in a manner integral with, and at the same thickness as, the collector electrode layer 12a.

As shown in FIGS. 4 (A) and (B), the third electrode sheet 13 has a rectangular collector electrode layer 13a of longitudinal dimension L13 identical to longitudinal dimension L11 mentioned above, and lateral dimension W13 identical to lateral dimension W11 mentioned above, as well as a polarizable electrode layer 13b formed over the entire bottom surface of the collector electrode layer 13a by means of coating, etc. (note that, in the drawings, the front edge and rear edge of the polarizable electrode layer 13b are slightly overlapping each lead connection part 13a1). The material and thickness of the collector electrode layer 13a are the same as those of the aforementioned collector electrode layer 11a, while the material and thickness of each polarizable electrode layer 13b are the same as those of the aforementioned polarizable electrode layer 11b. Also, a lead connection part 13a1 having the same shape as the aforementioned lead connection part 11a1 is provided on the right side of the collector electrode layer 13a on both ends in the longitudinal direction at the same position as the aforementioned lead connection part 11a1, in a manner integral with, and at the same thickness as, the collector electrode layer 13a.

In other words, the shape in top view of the collector electrode layer 11a (excluding the lead connection part 11a1) of the first electrode sheet 11, shape in top view of the collector electrode layer 12a (excluding the lead connection part 12a1) of the second electrode sheet 12, and shape in top view of the collector electrode layer 13a (excluding the lead connection part 13a1) of the third electrode sheet 13, are identical.

Also, the shape in top view of the polarizable electrode layer 11b of the first electrode sheet 11 and shape in bottom view of the polarizable electrode layer 12b on the bottom surface of the second electrode sheet 12 are identical. The shape in top view of the polarizable electrode layer 12b on the top surface of the second electrode sheet 12 and shape in bottom view of the polarizable electrode layer 13b of the third electrode sheet 13 are identical. As shown by the drawings, the polarizable electrode layer 12b on the top surface of the second electrode sheet 12 and polarizable electrode layer 13b of the third electrode sheet 13 have 180-degree reversed shapes of the polarizable electrode layer 11b of the first electrode sheet 11 in the lateral direction or longitudinal direction, respectively.

Furthermore, the collector electrode layer 11a (including the lead connection part 11a1) and polarizable electrode layer 11b of the first electrode sheet 11 are linearly symmetrical over the reference line VSL running at the center in the longitudinal direction as shown in FIG. 2 (A). The collector electrode layer 12a (including the lead connection part 12a1) and each polarizable electrode layer 12b of the second electrode sheet 12 are linearly symmetrical over the reference line VSL running at the center in the longitudinal direction as shown in FIG. 3 (A). The collector electrode layer 13a (including the lead connection part 13a1) and polarizable electrode layer 13b of the third electrode sheet 13 are linearly symmetrical over the reference line VSL running at the center in the longitudinal direction as shown in FIG. 4 (A).

As shown in FIGS. 5 (A) and (B), the separation sheet 14 has a rectangular shape of longitudinal dimension L14 slightly larger than longitudinal dimension L11 mentioned above, and lateral dimension W14 slightly larger than lateral dimension W11 mentioned above. The separation sheet 14 is made of cellulose sheet, plastic sheet or other ion permeation sheet, and its thickness is approx. 10 to 50 μm.

Figure 6:
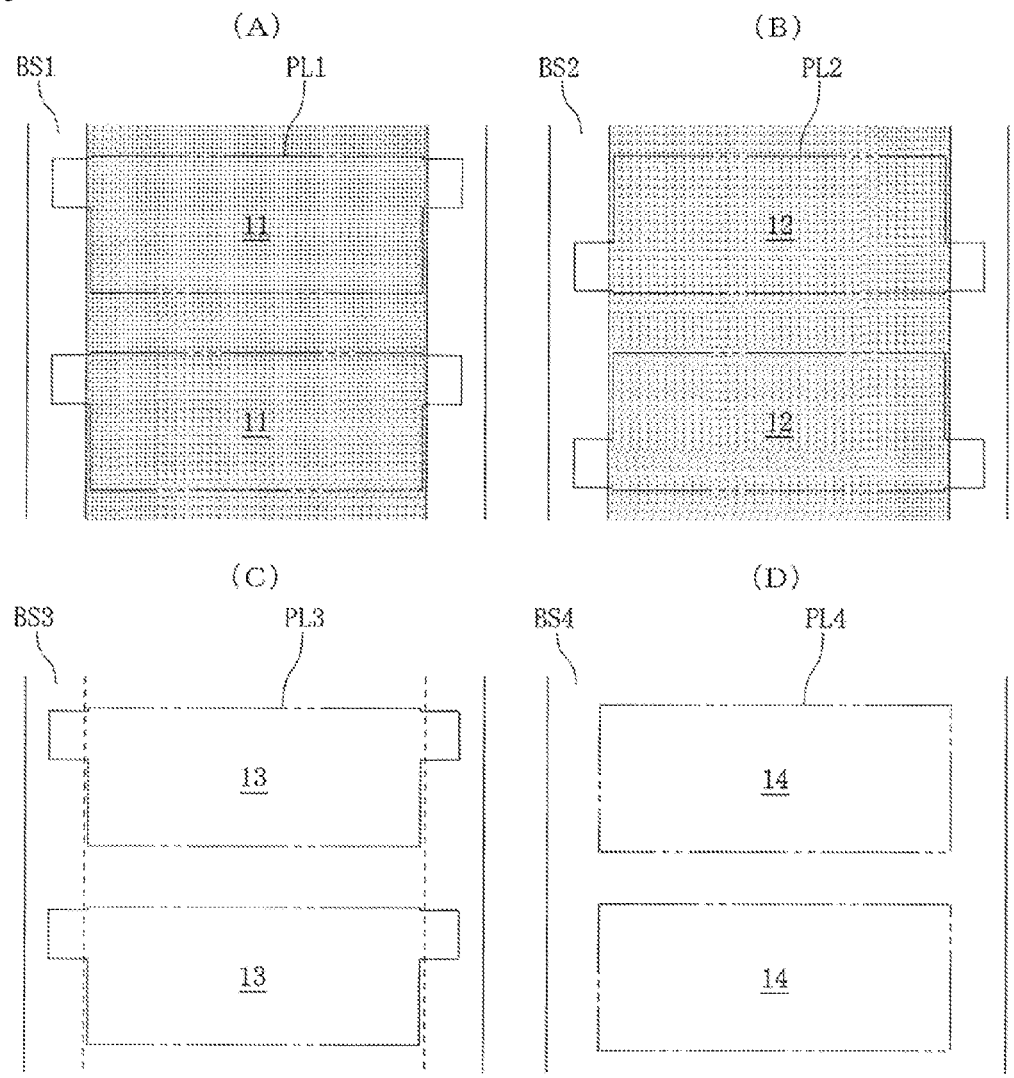
FIGS. 6 (A) to (D) are drawings showing a method for creating a first electrode sheet, second electrode sheet, third electrode sheet and separation sheet.

The aforementioned first electrode sheet 11, second electrode sheet 12, third electrode sheet 13 and separation sheet 14 can be obtained easily by cutting material sheets BS1 to BS4 along virtual lines PL1 to PL4 and then punching out the insides, respectively, as shown in FIGS. 6 (A) to (D). As shown by the drawings, the material sheet BS1 for first electrode sheet 11 is a strip-shaped collector electrode layer with a strip-shaped polarizable electrode layer formed on its top surface, the material sheet BS2 for second electrode sheet 12 is a strip-shaped collector electrode layer with a strip-shaped polarizable electrode layer formed on its top surface and bottom surface, and the material sheet BS3 for third electrode sheet 13 is a strip-shaped collector electrode layer with a strip-shaped polarizable electrode layer formed on its bottom surface.

Figure 7:
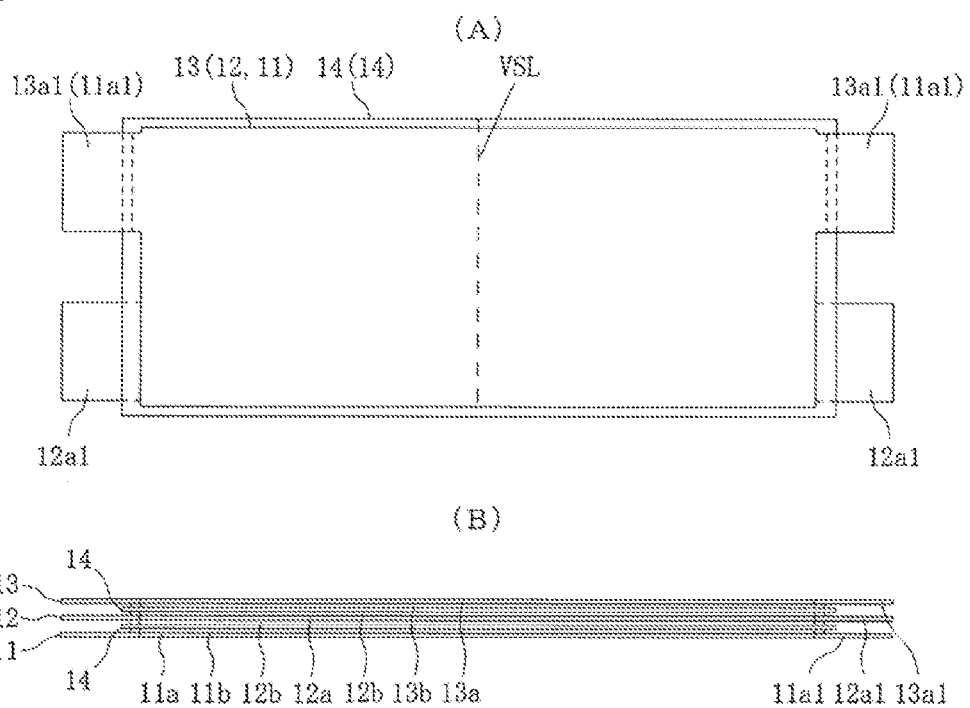
FIG. 7 (A) is a top view of a first electrode sheet, second electrode sheet, third electrode sheet and separation sheet stacked on top of each other to form a laminate, while FIG. 7 (B) is a left side view of the same.
Figure 9:
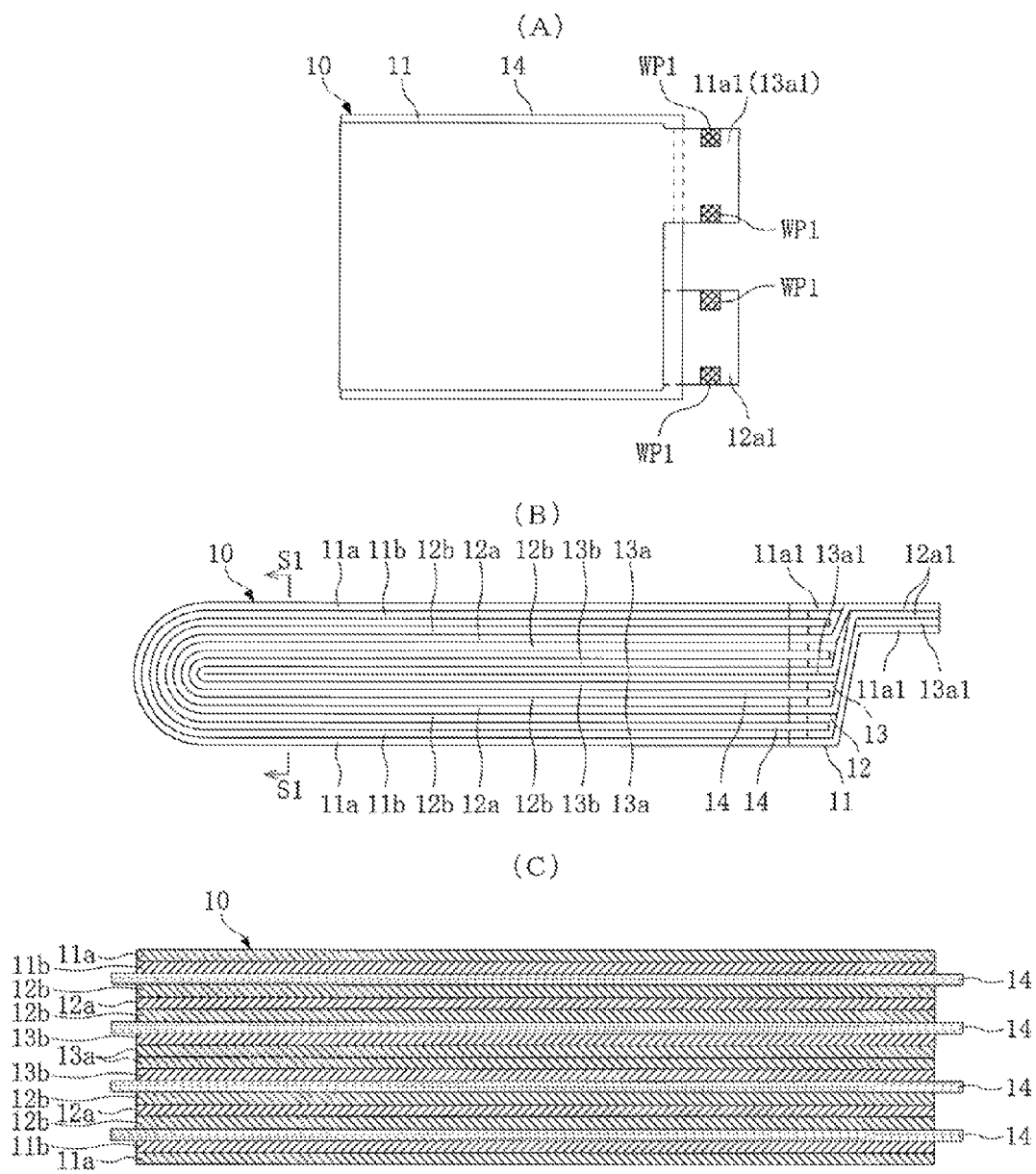
FIG. 9 (A) is a top view of lead connection parts of the folded laminate in FIG. 8 (A), FIG. 9 (B) is an enlarged left side view of the same, and FIG. 9 (C) is an enlarged section view of FIG. 9 (B) cut along line S1-S1.

To create the capacitor element 10 (refer to FIGS. 9 (A) and 1 (A)), the prepared first electrode sheet 11, second electrode sheet 12, third electrode sheet 13 and two separation sheets 14 are stacked in such a way that they are ordered as first electrode sheet 11, separation sheet 14, second electrode sheet 12, separation sheet 14 and third electrode sheet 13 from the bottom, as shown in FIGS. 7 (A) and (B).

When stacking the sheets, the outer peripheries of the collector electrode layers 11a, 12a, 13a of the first electrode sheet 11, second electrode sheet 12 and third electrode sheet 13 are caused to align in the stacking direction, while the outer peripheries of the lead connection parts 11a1, 13a1 of the first electrode sheet 11 and third electrode sheet 13 are caused to align in the stacking direction. Also, the outer peripheries of the two separation sheets 14 are caused to project outward from the outer peripheries of the respective collector electrode layers 11a, 12a, 13a, while the outer peripheries of the respective separation sheets 14 are caused to align in the stacking direction. Furthermore, the lead connection parts 11a1, 12a1, 13a1 of the first electrode sheet 11, second electrode sheet 12 and third electrode sheet 13 are caused to project by the same length from each separation sheet 14.

This way, a laminate (no reference numeral) is obtained where the polarizable electrode layer 11b of the first electrode sheet 11 and bottom polarizable electrode layer 12b of the second electrode sheet 12 are contacting the bottom separation sheet 14, while the top polarizable electrode layer 12b of the second electrode sheet 12 and polarizable electrode layer 13b of the third electrode sheet 13 are contacting the top separation sheet 14.

Figure 8:
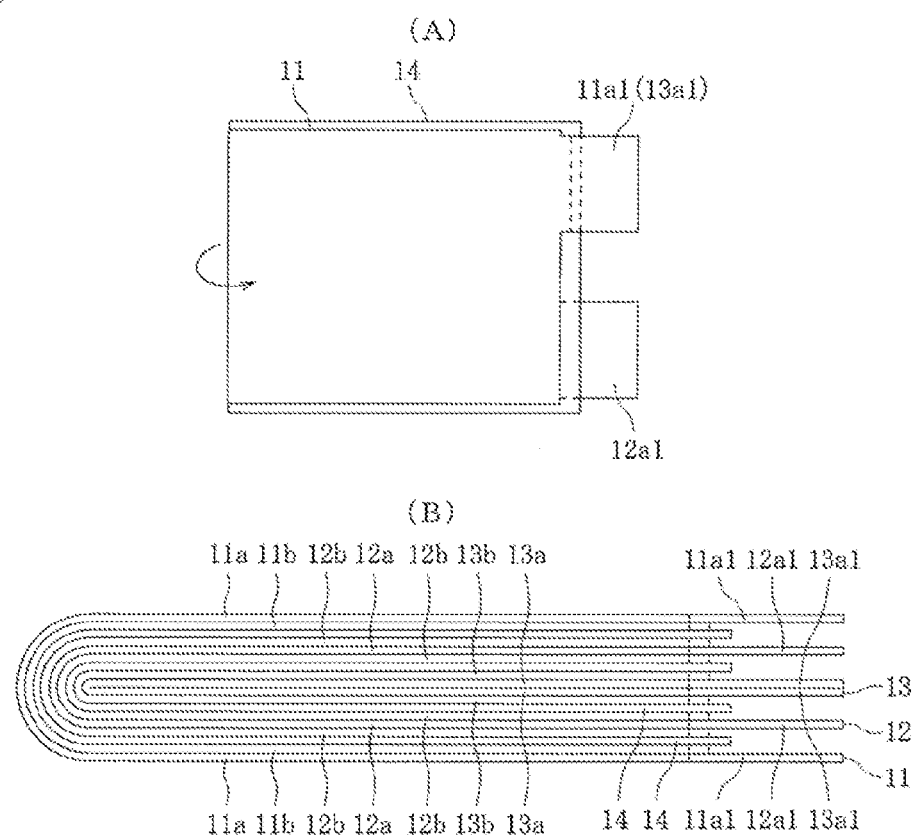
FIG. 8 (A) is a top view showing the laminate in FIG. 7 (A) being folded and superposed, while FIG. 8 (B) is an enlarged left side view of the same.

Next, as shown in FIGS. 8 (A) and (B), the part of the laminate in FIG. 7 (A) on the left side of the center in the longitudinal direction is folded upward along the reference line VSL shown in the drawing, and the left side is superposed with the right side.

At the time of this superposition, the outer peripheries of the lead connection parts 11a1, 13a1 of the first electrode sheet 11 and third electrode sheet 13 are caused to align in the superposing direction, while the outer peripheries of the lead connection parts 12a1 of the second electrode sheet 12 are caused to align in the superposing direction.

This way, a folded laminate (no reference numeral) is obtained, which has a configuration in which the first electrode sheet 11, second electrode sheet 12, third electrode sheet 13 and two separation sheets 14 are folded into two at an angle of approx. 180 degrees over the reference line VSL in such a way that the lead connection parts 11a1 of the first electrode sheet 11 are facing the lead connection parts 13a1 of the third electrode sheet 13, and the lead connection parts 12a1 of the second electrode sheet 12 are facing each other.

The next step on this folded laminate shown in FIG. 8 (A) is that, as shown in FIGS. 9 (A) to (C) the mutually facing lead connection parts 11a1 of the first electrode sheet 11 and lead connection parts 13a1 of the third electrode sheet 13 are superposed and two locations on both sides in the lateral direction are directly joined by means of spot-welding, ultrasonic welding, clinching, etc., to interconnect the lead connection parts 11a1, 13a1 (refer to the joining location WP1). Also, the mutually facing lead connection parts 12a1 of the second electrode sheet 12 are superposed at positions not contacting the aforementioned lead connection parts 11a1, 13a1, and two locations on both sides in the lateral direction are directly joined by means of spot-welding, ultrasonic welding, clinching, etc., to interconnect the lead connection parts 12a1 (refer to the joining location WP1).

This way, the capacitor element 10 is obtained, which has a configuration in which the first electrode sheet 11, second electrode sheet 12, third electrode sheet 13 and two separation sheets 14 are folded into two at an angle of approx. 180 degrees over the reference line VSL, while the lead connection parts 11a1 of the first electrode sheet 11 and lead connection parts 13a1 of the third electrode sheet 13 are interconnected, and the lead connection parts 12a1 of the second electrode sheet 12 are interconnected.

It should be noted that in FIGS. 2 to 9 (and also in FIG. 10), the thickness of the collector electrode layer 11a and polarizable electrode layer 11b of the first electrode sheet 11, the thickness of the collector electrode layer 12a and each polarizable electrode layer 12b of the second electrode sheet 12, the thickness of the collector electrode layer 13a and polarizable electrode layer 13b of the third electrode sheet 13, and the thickness of the separation sheet 14, have been increased from their actual thicknesses for the convenience of illustration, and therefore the vertical dimensions (overall thicknesses) in FIGS. 7 (B), 8 (B), 9 (B) and 9 (C) appear thicker than they actually are.

However, the thickness of the collector electrode layer 11a and polarizable electrode layer 11b of the first electrode sheet 11, the thickness of the collector electrode layer 12a and each polarizable electrode layer 12b of the second electrode sheet 12, the thickness of the collector electrode layer 13a and polarizable electrode layer 13b of the third electrode sheet 13, and the thickness of the separation sheet 14, are in a range of 5 to 50 μm and therefore even when the average of all layers is assumed as 30 μm, for example, the actual vertical dimension (overall thickness) in FIG. 7 (B) becomes 270 μm, while the actual vertical dimension (overall thickness) in FIGS. 8 (B), 9 (B) and 9 (C) becomes 540 μm.

In other words, the actual vertical dimension (overall thickness) of the capacitor element 10 shown in FIG. 9 (A) is less than 1000 μm, meaning that, with the folded laminate in FIG. 9 (B), the radius of curvature of the outer surface at the folded location is much smaller than illustrated and consequently the lead connection parts 11a1, 12a1, 13a1 are virtually not displaced in the longitudinal direction when folded. In addition, the polarizable electrode layers 11b, 12b, 13b do not separate from the collector electrode layers 11a, 12a, 13a when the laminate is folded, and the polarizable electrode layers 11b, 12b, 13b do not lose contact with each separation sheet 14, either. Furthermore, the collector electrode layers 11a, 12a, 13a, polarizable electrode layers 11b, 12b, 13b and each separation sheet 14 have sufficient flexibility to permit folding and thus do not break at the folded locations.

Also in FIG. 9 (B), the lead connection parts are partially extended for the convenience of illustration, or specifically to explain the connection of lead connection parts 11a1, 13a1 and the connection of lead connection parts 12a1 on the folded laminate. As understood from the foregoing explanation, however, in reality the lead connection parts can be connected without such extensions.

Figure 10:
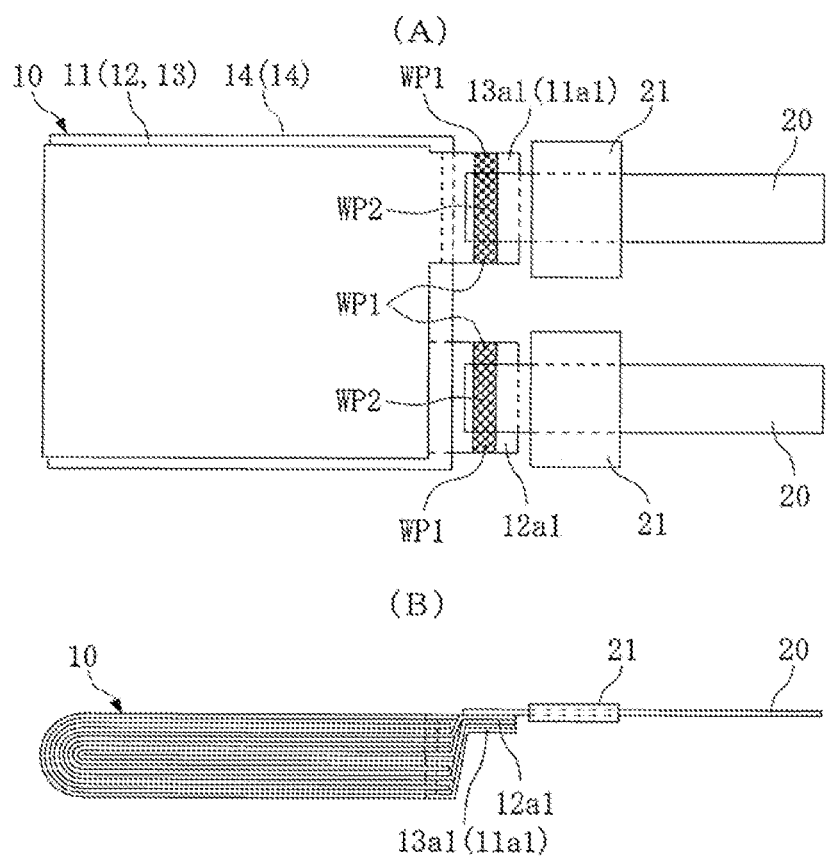
FIG. 10 (A) is a top view showing the capacitor element in FIG. 9 (A) to which leads are connected, while FIG. 10 (B) is a left side view of the same.

Next, FIG. 10 is used to explain the constitution of the lead 20 and how it is connected to the capacitor element 10.

To connect the lead 20 to the capacitor element 10, the lead 20 shown in FIGS. 10 (A) and (B) is prepared. This lead 20 is formed into a short strip shape made of aluminum, platinum, copper or other conductive material, and its thickness is 50 to 100 μm. It should be noted that a metal film may be formed on the surface of the lead 20 at its end by means of electroplating, etc., in order to facilitate connection of the lead 20 to an electrode pad, etc. Also on the surface of the lead 20 in the location corresponding to the front side of a seal area 31c of a package sheet 31 mentioned later, a seal reinforcement material 21 made of the same material as a seal layer LA3 mentioned later is provided so as to surround this location. This seal reinforcement material 21 is formed by sandwiching the lead 20 between two sheets, enclosing the lead 20 with one sheet, or coating a liquid on the surface of the lead 20, among others.

Next, as shown in FIGS. 10 (A) and (B), one end of the one lead 20 is placed over the lead connection parts 11a1, 13a1 connected earlier, and this end is directly joined, by means of spot-welding, ultrasonic welding, clinching, etc., to connect the lead 20 to the lead connection parts 11a1, 13a1 connected earlier (refer to the joining location WP2). Also, one end of the other lead 20 is placed over the lead connection parts 12a1 connected earlier, and this end is directly joined, by means of spot-welding, ultrasonic welding, clinching, etc., to connect the lead 20 to the lead connection parts 12a1 connected earlier (refer to the joining location WP2).

As shown in FIG. 10 (A), by making each lead 20 smaller than the lead connection parts 11a1, 12a1, 13a1 in the lateral dimension and by ensuring the joining location WP2 is positioned inside the joining locations WP1 on the left and right and that these joining locations WP1, WP2 lie along a straight line, problems of connection failures caused by overlapping joining areas can be suppressed to reliably make each connection, while the electrical resistances between the left/right joining locations WP1 and joining location WP2, or specifically electrical resistance between the one lead 20 and collector electrode layers 11a, 13a and electrical resistance between the other lead 20 and collector electrode layer 12a, can be reduced.

Next, FIGS. 11 to 15 are used to explain the constitution of, and method for creating, the package 30.

Figure 11:
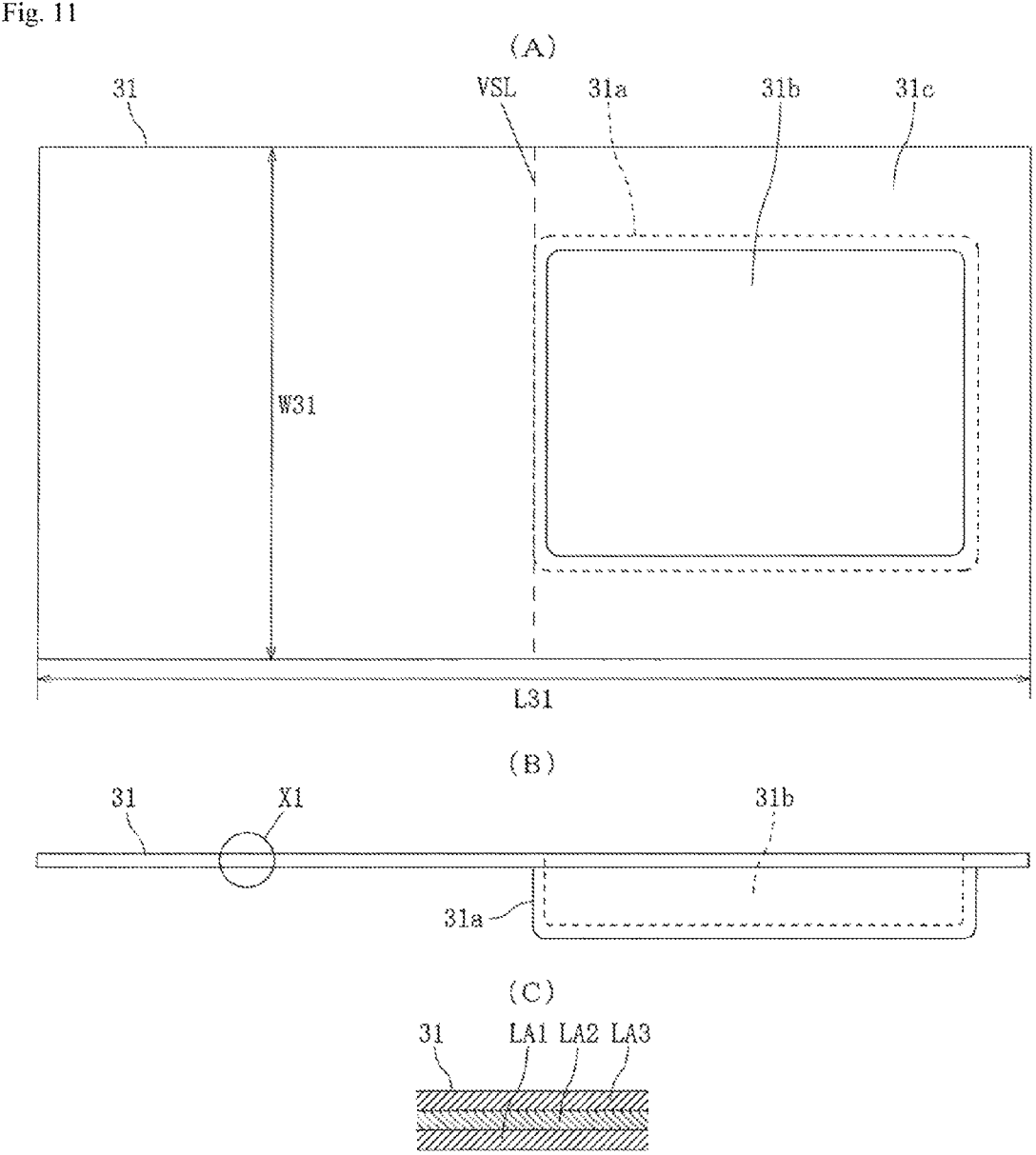
FIG. 11 (A) is a top view of a package sheet, FIG. 11 (B) is a left side view of the same, and FIG. 11 (C) is an enlarged section view of X1 in FIG. 11 (B).

To create the package 30, a package sheet 31 shown in FIGS. 11 (A) to (C) is prepared. As shown in FIG. 11 (C), this package sheet 31 is made of a three-layer laminate film constituted by a protective layer LA1, a barrier layer LA2 and a seal layer LA3 laminated in this order. The protective layer LA1 is made of nylon, polyethylene phthalate or other heat-resistant plastic, and its thickness is 10 to 50 μm. The barrier layer LA2 is made of aluminum or other metal or metal oxide, and its thickness is 10 to 50 μm. The seal layer LA3 is made of polypropylene, modified polypropylene or other thermoplastic, and its thickness is 30 to 50 μm.

As shown in FIGS. 11 (A) and (B), the package sheet 31 forms a rectangular shape of specified longitudinal dimension L31 and lateral dimension W31, and has a rectangular solid overhang 31a on the right side of the center in the longitudinal direction, and provided inside of this overhang is a concaved part 31b of similar shape. The depth of the concaved part 31b is slightly larger than the vertical dimension (overall thickness) of the aforementioned capacitor element 10, and its outline in top view is slightly larger than the outline of the capacitor element 10 in top view. The area of the package sheet 31 on the right side of the center in the longitudinal direction where this concaved part 31b does not exist is a seal area 31c, and the seal layer LA3 is positioned on the top surface of the package sheet 31.

Figure 1:
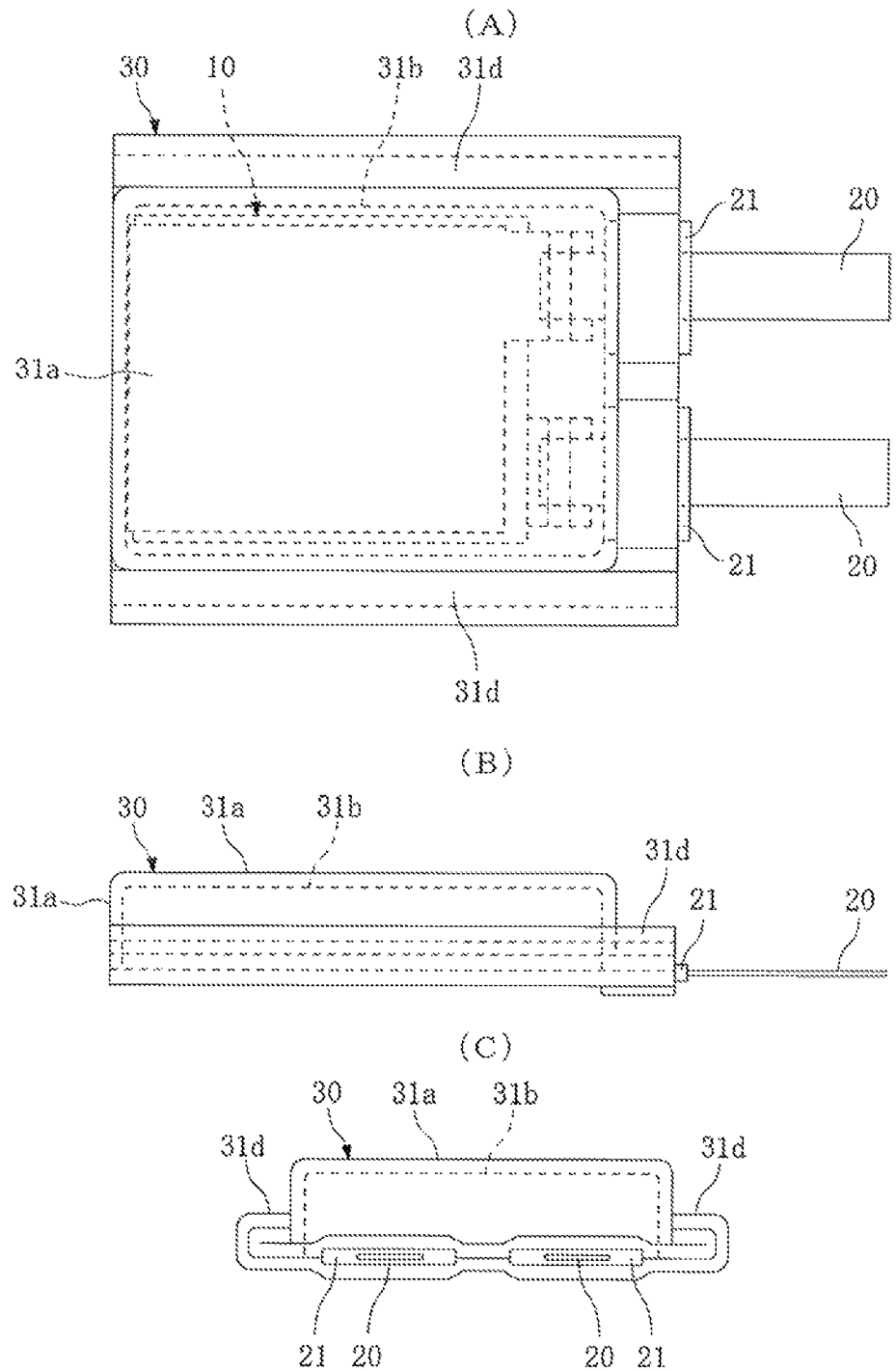
FIG. 1 (A) is a top view of an electric double-layer capacitor to which the present invention is applied, FIG. 1 (B) is a left side view of the same, and FIG. 1 (C) is a front view of the same.
Figure 12:
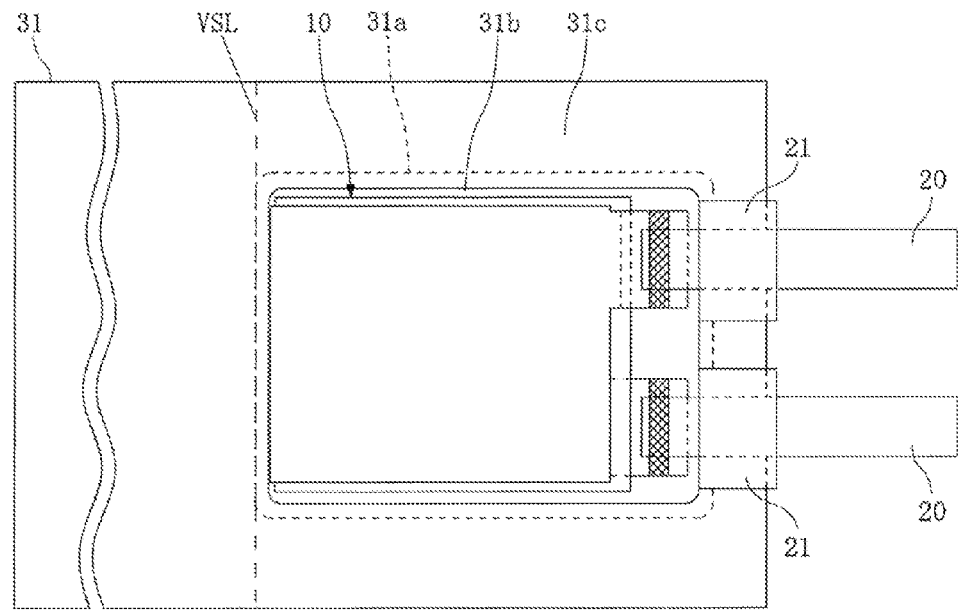
FIG. 12 is a top view showing a capacitor element inserted in a concaved part of a package sheet.

To create the package 30 (refer to FIGS. 1 (A) to (C)), as shown in FIG. 12 the capacitor element 10 of the capacitor element 10 with lead 20 as shown in FIG. 10 (A) is inserted into the concaved part 31b, and at the same time the seal reinforcement material 21 of each lead 20 is placed on the front side of the seal area 31c. Since the longitudinal dimension of each seal reinforcement material 21 is slightly larger than the longitudinal dimension of the front side of the seal area 31c, when inserting the capacitor element 10 into the concaved part 31b, the front edge of each seal reinforcement material 21 is caused to project slightly outward from the front edge of the front side of the seal area 31c.

Figure 13:
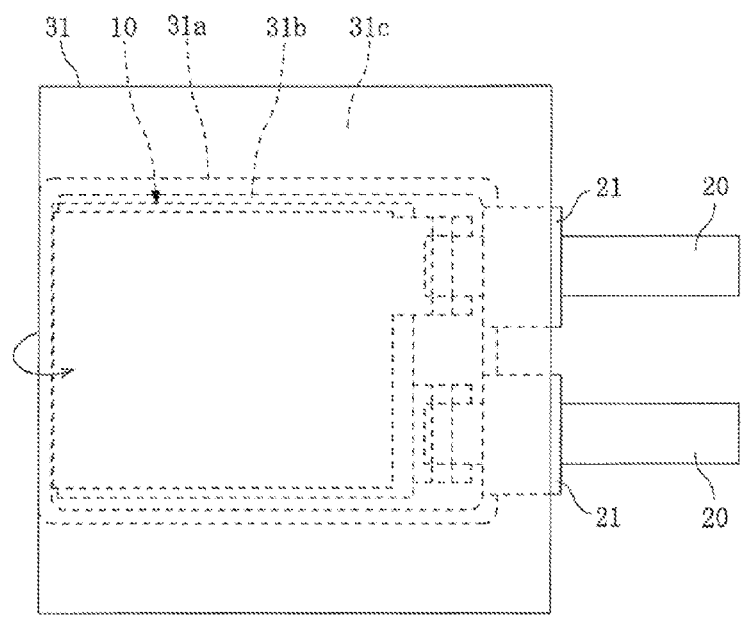
FIG. 13 is a top view showing a package sheet being folded and superposed.

Next, as shown in FIG. 13, the part of the package sheet 31 in FIG. 12 on the left side of the center in the longitudinal direction is folded upward along the reference line VSL shown in the drawing, and the left side is superposed with the right side.

This way, a semi-finished package (no reference numeral) is obtained, which has a configuration in which the seal layer LA3 on the left side of the package sheet 31 is facing the seal layer LA3 in the seal area 31c on the right side.

Figure 14:
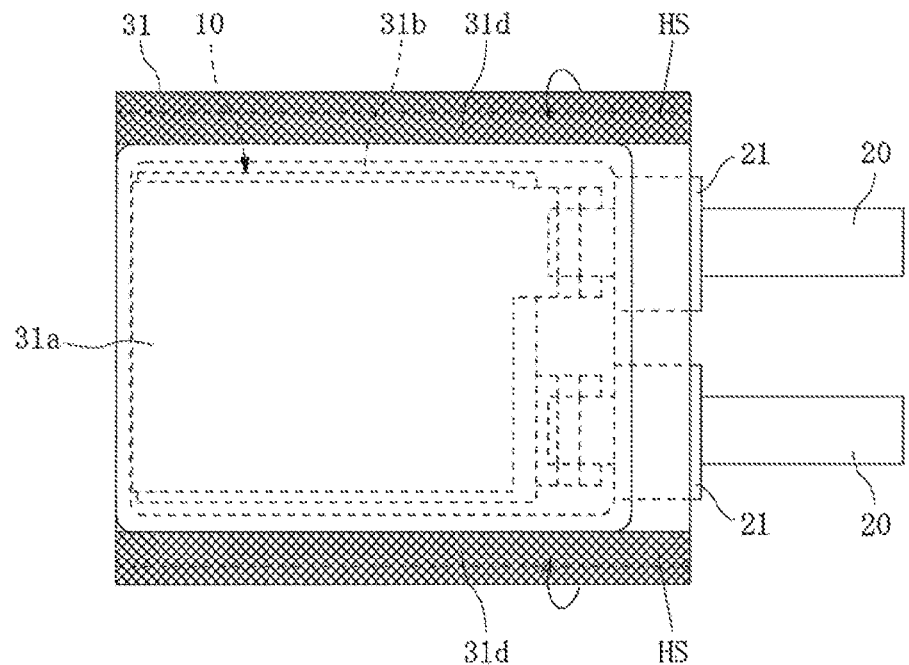
FIG. 14 is a top view showing the semi-finished package in FIG. 13 whose left side and right side are heat-sealed.

Next, as shown in FIG. 14, the semi-finished package shown in FIG. 13 is flipped upside down and heat is applied to the left side and right side to heat-seal the mutually facing seal layers LA3, after which the heat-sealed left side and right side are folded upward and then heat is applied again to a folded part 31d to increase the reliability of heat-sealing (refer to the heat-sealing location HS).

Figure 15:
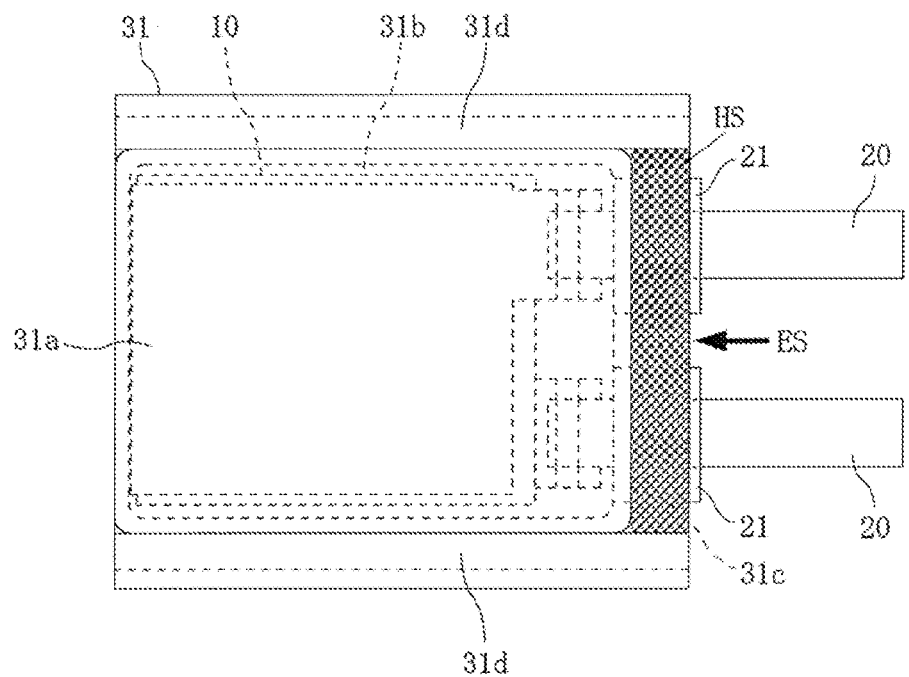
FIG. 15 is a top view showing the semi-finished package in FIG. 14 whose front side is heat-sealed.

Next, as shown in FIG. 15, electrolyte ES (such as a mixture of propylene carbonate (solvent) and triethyl methyl ammonium fluoroborate (solute)) is injected into the concaved part 31b using an appropriate injection implement through the front side of the semi-finished package in FIG. 14 which is not yet heat-sealed. After the electrolyte has been injected, heat is applied to the front side of the semi-finished package to heat-seal the mutually facing seal layers LA3 by sandwiching each seal reinforcement material 21 in between (refer to the heat-sealing location HS).

This way, an electric double-layer capacitor structured in such a way that the capacitor element 10 is sealed in the package 30 together with electrolyte ES (refer to FIGS. 1 (A) to (C)) can be obtained.

It should be noted that the seal layer LA3 of the package sheet 31 is not itself significantly thick, so the lead 20 may contact the barrier layer LA2 depending on the melting condition when the front side of the semi-finished package is heat-sealed.

However, heat-sealing the front side of the semi-finished package by sandwiching each seal reinforcement material 21 in between allows the virtual thickness of the seal layer LA3 to be increased by the thickness of each seal reinforcement material 21, as a result of which contact between each lead 20 and the barrier layer LA2 can be prevented in a reliable manner at the time of heat-sealing.

The capacitor element 10 of the aforementioned electric double-layer capacitor has a configuration in which the laminate shown in FIG. 7 (A) is folded along the reference line VSL and superposed (refer to FIG. 9 (B)), where the collector electrode layer 11a and polarizable electrode layer 11b of the first electrode sheet 11, the collector electrode layer 12a and each polarizable electrode layer 12b of the second electrode sheet 12, the collector electrode layer 13a and polarizable electrode layer 13b of the third electrode sheet 13, and two separation sheets 14, are connected to each other via the folded locations. Accordingly, although the layer structure in section view is the same as that of the conventional capacitor element, this capacitor element can have fewer edge areas in the polarizable electrode layers 11b, 12b, 13b compared to the conventional capacitor element.

In other words, the conventional capacitor element is vulnerable to breakage and other damage due to a higher density of lines of electric force at the edges of each polarizable electrode layer when voltage is applied to the capacitor element, and therefore presents the risk of problems affecting the capacitor element as a whole, such as a drop in its voltage resistance characteristics and shortening of its life caused by such damage. On the other hand, the aforementioned capacitor element 10 has fewer edge areas in each polarizable electrode layer 11b, 12b or 13b compared to the conventional capacitor element and can therefore effectively suppress the aforementioned damage and reliably suppress problems affecting the capacitor element 10 as a whole, such as drop in its voltage resistance characteristics and shortening of its life caused by such damage.

Also, with respect to the capacitor element 10 of the aforementioned electric double-layer capacitor, it can be considered that the collector electrode layer, polarizable electrode layer, separation sheet, polarizable electrode layer and collector electrode layer constitute one charge/discharge cell, and therefore given the layer structure shown in FIG. 9 (C), this capacitor element 10 appears to have four charge/discharge cells. However, the capacitor element 10 is folded in the manner shown in FIG. 9 (B) and the collector electrode layer 11a and polarizable electrode layer 11b of the first electrode sheet 11, collector electrode layer 12a and each polarizable electrode layer 12b of the second electrode sheet 12, collector electrode layer 13a and polarizable electrode layer 13b of the third electrode sheet 13, and two separation sheets 14, are connected to each other via the folded locations, and accordingly the capacitor element 10 can be expressed by an equivalent circuit where two charge/discharge cells are electrically connected in parallel with a pair of leads 20.

In other words, although the layer structure in section view is the same as that of the conventional capacitor element, the number of charge/discharge cells can be reduced by half, meaning that the number of charge/discharge cells can be reduced to limit the range of variation in charge/discharge characteristics. As a result, undesirable effects of varying charge/discharge characteristics, or specifically accumulation of physicochemical damage of certain charge/discharge cells that offer good charge/discharge characteristics and therefore perform more charging/discharging than other cells, where such damage causes the charge/discharge characteristics of the capacitor element as a whole to drop, makes the life of the capacitor element shorter, or presents other problems, can be suppressed in a reliable manner.

Furthermore, the capacitor element 10 of the aforementioned electric double-layer capacitor is not only folded in the manner shown in FIG. 9 (B), but it is also such that the lead connection parts 11a1 of the first electrode sheet 11 and lead connection parts 13a1 of the third electrode sheet 13 are interconnected, while the lead connection parts 12a1 of the second electrode sheet 12 are interconnected.

In other words, the polarizable electrode layer 11b of the first electrode sheet 11 positioned at the outermost point of the capacitor element 10 is contacting the separation sheet 14 present on its inside, while this separation sheet 14 is contacting the one polarizable electrode layer 12b of the second electrode sheet 12 and the other polarizable electrode layer 12b of the second electrode sheet 12 is contacting the separation sheet 14 present on its inside, while this separation sheet 14 is contacting the polarizable electrode layer 13b of the third electrode sheet 13, and the foregoing arrangement has the effect that, by interconnecting the lead connection parts 11a1 of the first electrode sheet 11 and lead connection parts 13a1 of the third electrode sheet 13, and also by interconnecting the lead connection parts 12a1 of the second electrode sheet 12, the relative positions of the first electrode sheet 11, second electrode sheet 12, third electrode sheet 13 and each separation sheet 14 constituting the capacitor element 10 can be fixed properly in the longitudinal direction and lateral direction.

In other words, the first electrode sheet 11, second electrode sheet 12, third electrode sheet 13 and two separation sheets 14 constituting the capacitor element 10 are not easily displaced relative to each other, which has the effect of reliably suppressing deformation of the shape of the capacitor element 10 due to the aforementioned displacement, and consequent deterioration of the charge/discharge characteristics of the element, in the process of manufacturing the electric double-layer capacitor, the process of using the manufactured electric double-layer capacitor, or the like.

Figure 16:
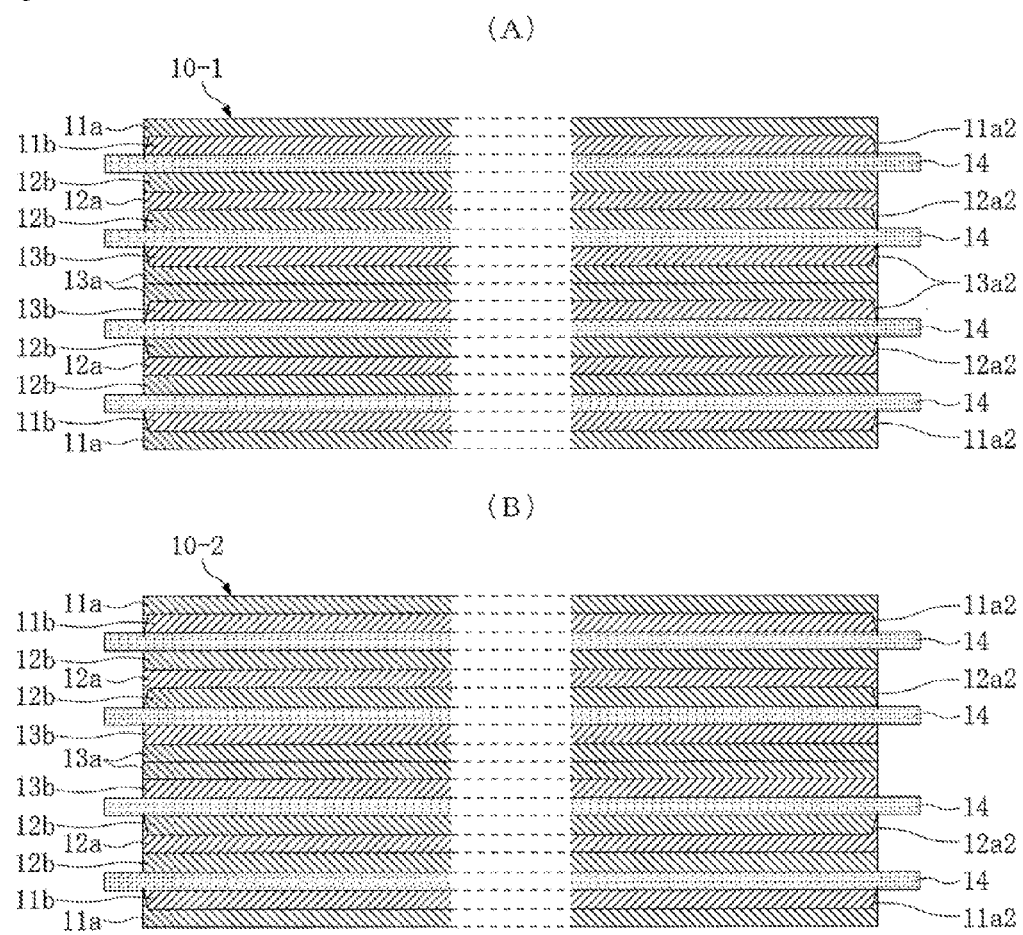
FIGS. 16 (A) and (B) are enlarged section views corresponding to FIG. 9 (C), showing examples of anti-displacement projections provided on collector electrode layers of electrode sheets.

FIGS. 16 (A) and (B) show examples of anti-displacement projections provided on at least one of the first electrode sheet 11 and third electrode sheet 13, and on the second electrode sheet 12, respectively.

In the case of the capacitor element 10-1 shown in FIG. 16 (A), an anti-displacement projection 11a2, whose height is greater than the thickness of the polarizable electrode layer 11b, is provided on the outer periphery of the collector electrode layer 11a of the first electrode sheet 11, an anti-displacement projection 12a2, whose height is greater than the thickness of the polarizable electrode layer 12b, is provided on the outer periphery of the collector electrode layer 12a of the second electrode sheet 12, and an anti-displacement projection 13a2, whose height is greater than the thickness of the polarizable electrode layer 13b, is provided on the outer periphery of the collector electrode layer 13a of the third electrode sheet 13. These anti-displacement projections 11a2, 12a2, 13a2 may be shaped in such a way that they are connected or not connected along the outer peripheries, but it is desirable that they are provided in at least two locations of the outer periphery in order to prevent two-dimensional displacement.

As shown by this drawing, the anti-displacement projection 11a2 of the first electrode sheet 11 bites into the adjacent separation sheet 14 without piercing through it, the anti-displacement projection 12a2 of the second electrode sheet 12 bites into the adjacent separation sheet 14 without piercing through it, and the anti-displacement projection 13a2 of the third electrode sheet 13 bites into the adjacent separation sheet 14 without piercing through it. In the drawing, the anti-displacement projections 12a2, 13a2 bite into the separation sheets 14 in the second and third layers from the top in a manner facing each other in the vertical direction, but contact between the anti-displacement projections 12a2, 13a2 can be avoided by adjusting their biting depths.

In the case of the capacitor element 10-2 shown in FIG. 16 (B), an anti-displacement projection 11a2, whose height is greater than the thickness of the polarizable electrode layer 11b, is provided on the outer periphery of the collector electrode layer 11a of the first electrode sheet 11, and an anti-displacement projection 12a2, whose height is greater than the thickness of the polarizable electrode layer 12b, is provided on the outer periphery of the collector electrode layer 12a of the second electrode sheet 12, but no anti-displacement projection is provided on the collector electrode layer 13a of the third electrode sheet 13. These anti-displacement projections 11a2, 12a2 may be shaped in such a way that they are connected or not connected along the outer peripheries, but it is desirable that they are provided in at least two locations of the outer periphery in order to prevent two-dimensional displacement.

As shown by this drawing, the anti-displacement projection 11a2 of the first electrode sheet 11 bites into the adjacent separation sheet 14 without piercing through it, while the anti-displacement projection 12a2 of the second electrode sheet 12 bites into the adjacent separation sheet 14 without piercing through it, and the anti-displacement projection 13a2 of the third electrode sheet 13 bites into the adjacent separation sheet 14 without piercing through it. No anti-displacement projection is provided on the collector electrode layer 13a of the third electrode sheet 13 because, as explained earlier, the relative positions of the collector electrode layer 11a of the first electrode sheet 11 and collector electrode layer 13a of the third electrode sheet 13 are fixed in the longitudinal direction and lateral direction by means of interconnection of the lead connection parts 11a1, 13a1.

Methods that can be adopted to form the aforementioned anti-displacement projections 11a2, 12a2, 13a2 include a method to press an appropriate processing jig against the outer peripheries of the collector electrode layers 11a, 12a, 13a to deform the outer peripheries, and a method to use a press cutter to cause the outer peripheries of the collector electrode layers 11a, 12a, 13a to sag by means of press cutting when cutting along the virtual lines PL1 to PL3 in the creation method explained in FIGS. 6 (A) to (C).

By adopting the projection biting structure shown in FIGS. 16 (A) and (B), mutual displacement of the first electrode sheet 11, second electrode sheet 12, third electrode sheet 13 and two separation sheets 14 constituting the capacitor element 10-1 or 10-2 can be prevented in a more reliable manner, which suppresses, in a more reliable manner, deformation of the shape of the capacitor element 10-1 or 10-2 due to the aforementioned displacement, and consequent deterioration of the charge/discharge characteristics of the element, in the process of manufacturing the electric double-layer capacitor, the process of using the manufactured electric double-layer capacitor, or the like.

Orientations of the aforementioned anti-displacement projections are not limited to those shown in FIGS. 16 (A) and (B) and, for example, one of the anti-displacement projections 12a2 provided in the lateral direction on the collector electrode layer 12a of the second electrode sheet 12 may be facing downward, while the other projection in the lateral direction may be facing upward. Or, one of the anti-displacement projections 13a2 provided in the lateral direction on the collector electrode layer 13a of the third electrode sheet 13 may be facing downward, while the other projection in the lateral direction may be facing upward, and the downward-facing anti-displacement projection 13a2 may be caused to bite into the opposing collector electrode layer 13a.

Second Embodiment

FIGS. 17 to 30 show an embodiment where the present invention is applied to a lithium ion capacitor. This lithium ion capacitor has a capacitor element 40, a pair of leads 20 connected to the capacitor element 40, and a package 50 in which the capacitor element 40 is sealed in a manner partially exposing the pair of leads 20.

Note that, in the following explanations, the direction toward the viewer, away from the viewer, right, left, bottom and top in FIG. 17 (A) are referred to as top, bottom, front, rear, left and right, respectively, while the corresponding directions in other drawings are also referred to as top, bottom, front, rear, left and right, respectively, for the convenience of explanation. Also note that the constitutions of the lead 20 and seal reinforcement material 21 are the same as those described in the first embodiment and therefore explained using the same reference numerals.

First, FIGS. 18 to 25 are used to explain the constitution of, and method for creating, the capacitor element 40.

Figure 18:
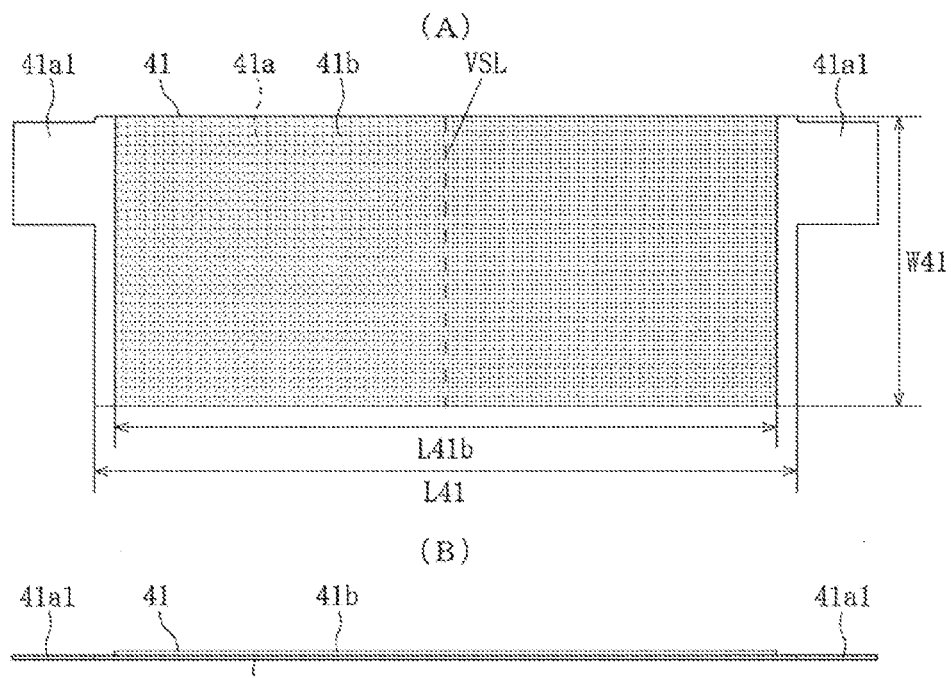
FIG. 18 (A) is a top view of a first electrode sheet, while FIG. 18 (B) is a left side view of the same.
Figure 19:
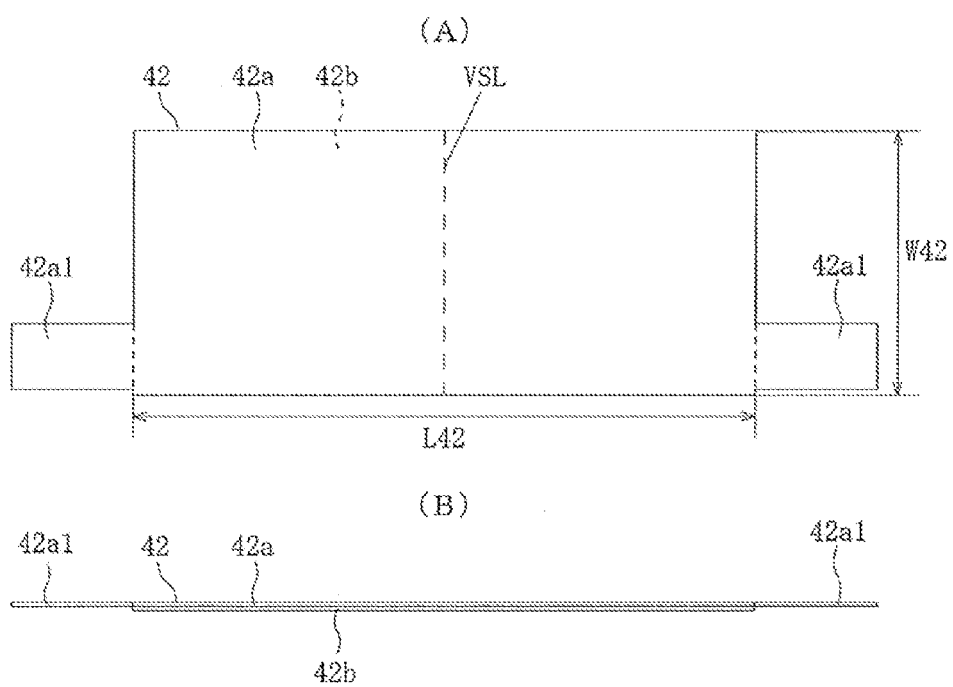
FIG. 19 (A) is a top view of a second electrode sheet, while FIG. 19 (B) is a left side view of the same.
Figure 20:
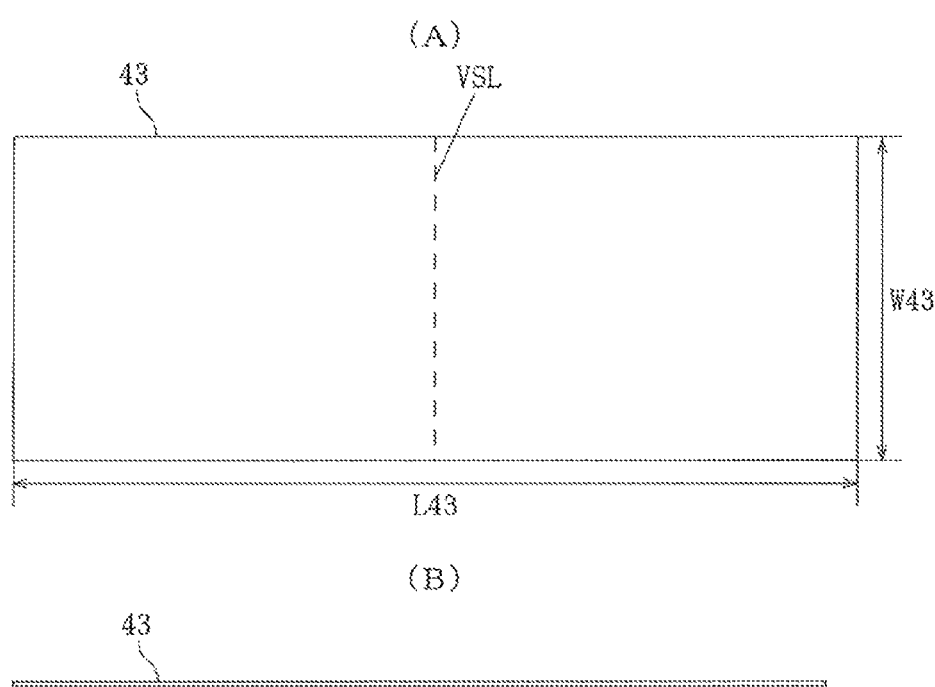
FIG. 20 (A) is a top view of a separation sheet, while FIG. 20 (B) is a left side view of the same.

To create the capacitor element 40, a first electrode sheet 41 shown in FIGS. 18 (A) and (B), a second electrode sheet 42 shown in FIGS. 19 (A) and (B), and a separation sheet 43 shown in FIGS. 20 (A) and (B) are prepared.

As shown in FIGS. 18 (A) and (B), the first electrode sheet 41 has a rectangular collector electrode layer 41a of specified longitudinal dimension L41 and lateral dimension W41, as well as a polarizable electrode layer 41b formed over the entire top surface of the collector electrode layer 41a, except for both ends in the longitudinal direction, by means of coating, etc. The longitudinal dimension L41b of this polarizable electrode layer 41a is slightly smaller than the aforementioned longitudinal dimension L41. The collector electrode layer 41a is made of copper or other conductive material, and its thickness is 5 to 50 μm. The polarizable electrode layer 41b is made of graphite or other substance that can reversibly support lithium ions, and its thickness is 50 to 100 μm. Also, a rectangular lead connection part 41a1 is provided on the right side of the collector electrode layer 41a on both ends in the longitudinal direction in a manner integral with, and at the same thickness as, the collector electrode layer 41a.

As shown in FIGS. 19 (A) and (B), the second electrode sheet 42 has a rectangular collector electrode layer 42a of longitudinal dimension L42 slightly smaller than longitudinal dimension L41 mentioned above, and a lateral dimension W42 slightly smaller than lateral dimension W41 mentioned above, as well as a polarizable electrode layer 42b formed over the entire bottom surface of the collector electrode layer 42a by means of coating, etc. It should be noted that the difference between the longitudinal dimension L42 of the collector electrode layer 42a and aforementioned longitudinal dimension L41, and the difference between the lateral dimension W42 and aforementioned lateral dimension W41, are actually approx. 0.3 to 2.0 mm. The collector electrode layer 42a is made of aluminum or other conductive material, and its thickness is 5 to 100 μm. The polarizable electrode layer 42b is made of active carbon or other substance that can reversibly support lithium ions, and its thickness is 5 to 200 μm. Also, a rectangular lead connection part 42a1, whose lateral dimension (width) is smaller and whose longitudinal dimension is greater than those of the aforementioned lead connection part 41a1, is provided on the left side of the collector electrode layer 42a on both ends in the longitudinal direction in a manner integral with, and at the same thickness as, the collector electrode layer 42a. The distance between the front edge of the front lead connection part 42a1 and the rear edge of the rear lead connection part 42a1 is the same as the distance between the front edge of the front lead connection part 41a1 and the rear edge of the rear lead connection part 41a1 of the aforementioned first electrode sheet 41.

In other words, the shape in top view of the collector electrode layer 41a (excluding the lead connection part 41a1) of the first electrode sheet 41 is larger than the shape in top view of the collector electrode layer 42a (excluding the lead connection part 42a1) of the second electrode sheet 42. Also, the shape in top view of the polarizable electrode layer 41b of the first electrode sheet 41 is larger than the shape in top view of the polarizable electrode layer 42b of the second electrode sheet 42.

Furthermore, the collector electrode layer 41a (including the lead connection part 41a1) and polarizable electrode layer 41b of the first electrode sheet 41 are linearly symmetrical over the reference line VSL running at the center in the longitudinal direction as shown in FIG. 18 (A). The collector electrode layer 42a (including the lead connection part 42a1) and the polarizable electrode layer 42b of the second electrode sheet 42 are linearly symmetrical over the reference line VSL running at the center in the longitudinal direction as shown in FIG. 19 (A).

As shown in FIGS. 20 (A) and (B), the separation sheet 43 has a rectangular shape of longitudinal dimension L43 slightly larger than longitudinal dimension L41 mentioned above, and a lateral dimension W43 slightly larger than lateral dimension W41 mentioned above. The separation sheet 43 is made of cellulose sheet, plastic sheet or other ion permeation sheet, and its thickness is approx. 10 to 50 μm.

Figure 21:
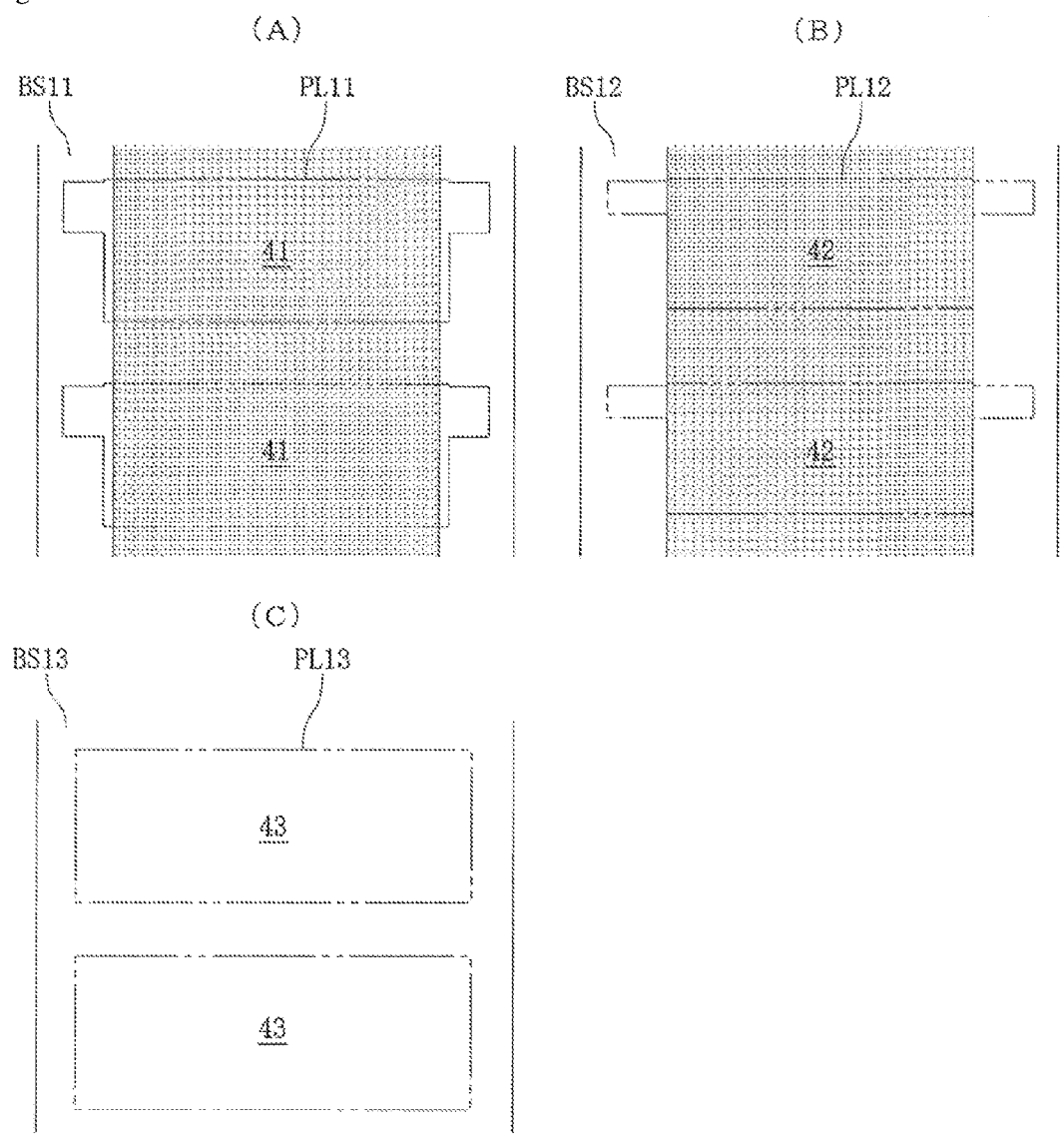
FIGS. 21 (A) to (C) are drawings showing a method for creating a first electrode sheet, second electrode sheet and separation sheet.

The aforementioned first electrode sheet 41, second electrode sheet 42 and separation sheet 43 can be obtained easily by cutting material sheets BS11 to BS13 along virtual lines PL11 to PL13 and then punching out the insides, respectively, as shown in FIGS. 21 (A) to (C). As shown by the drawings, the material sheet BS11 for first electrode sheet 41 is a strip-shaped collector electrode layer with a strip-shaped polarizable electrode layer formed on its top surface, while the material sheet BS12 for second electrode sheet 42 is a strip-shaped collector electrode layer with a strip-shaped polarizable electrode layer formed on its top surface.

Figure 22:
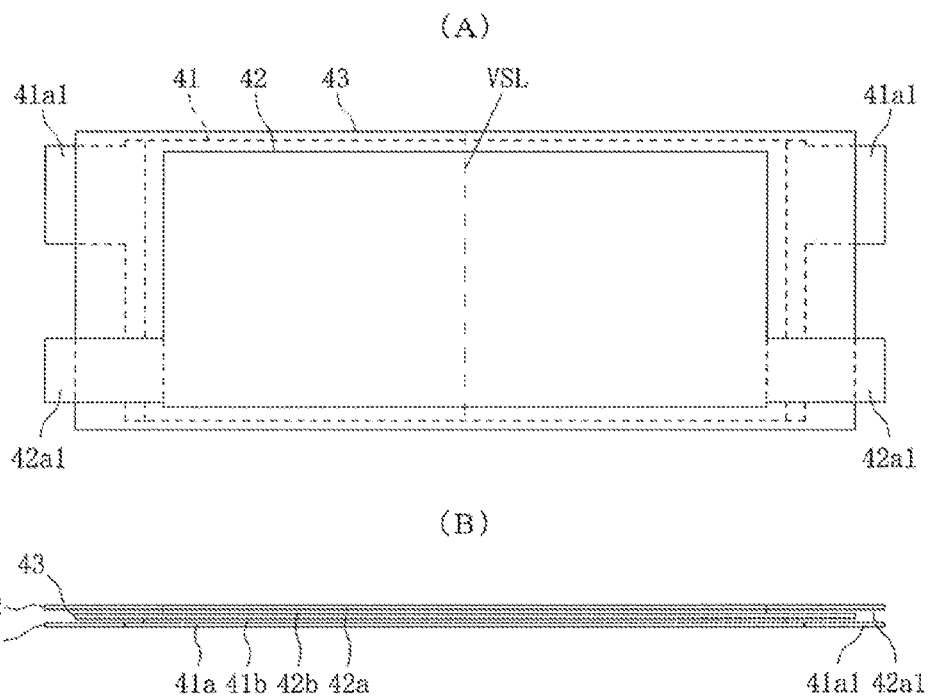
FIG. 22 (A) is a top view of a first electrode sheet, second electrode sheet and separation sheet stacked on top of each other to form a laminate, while FIG. 22 (B) is a left side view of the same.
Figure 24:
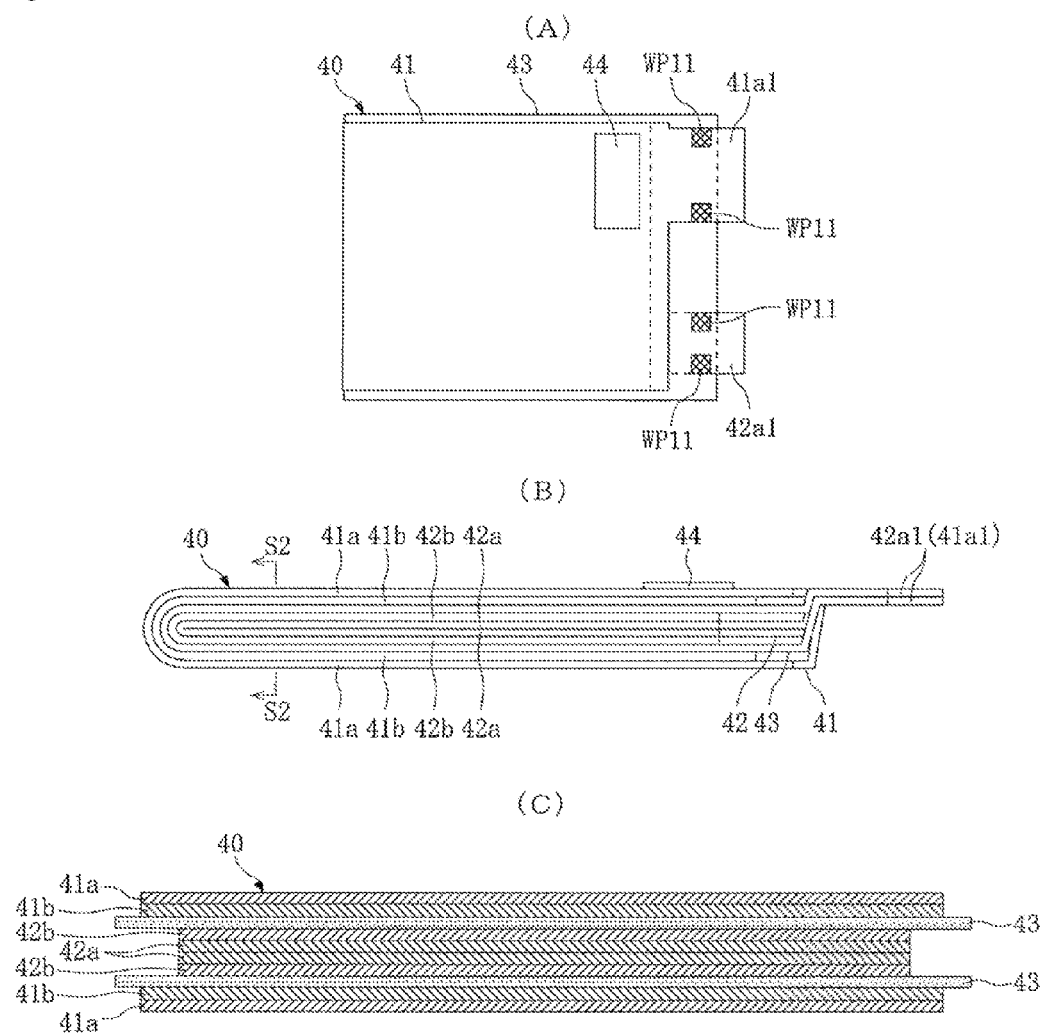
FIG. 24 (A) is a top view of lead connection parts of the folded laminate in FIG. 23 (A), FIG. 24 (B) is an enlarged left side view of the same, and FIG. 24 (C) is an enlarged section view of FIG. 24 (B) cut along line S2-S2.

To create the capacitor element 40 (refer to FIGS. 24 (A) and 17 (A)), the prepared first electrode sheet 41, second electrode sheet 42 and separation sheet 43 are stacked in such a way that they are ordered as first electrode sheet 41, separation sheet 43 and second electrode sheet 42 from the bottom, as shown in FIGS. 22 (A) and (B).

When stacking the sheets, the outer periphery of the polarizable electrode layer 41b of the first electrode sheet 41 is caused to project outward from the outer periphery of the polarizable electrode layer 42b of the second electrode sheet 42, while the outer periphery of the separation sheet 43 is caused to project outward from the outer periphery of the collector electrode layer 41a of the first electrode sheet 41. Also, the lead connection parts 41a1, 42a1 of the first electrode sheet 41 and second electrode sheet 42 are caused to project by the same length from the separation sheet 43.

This way, a laminate (no reference numeral) is obtained where the polarizable electrode layer 41b of the first electrode sheet 41 and the polarizable electrode layer 42b of the second electrode sheet 42 are contacting the separation sheet 43.

Figure 23:
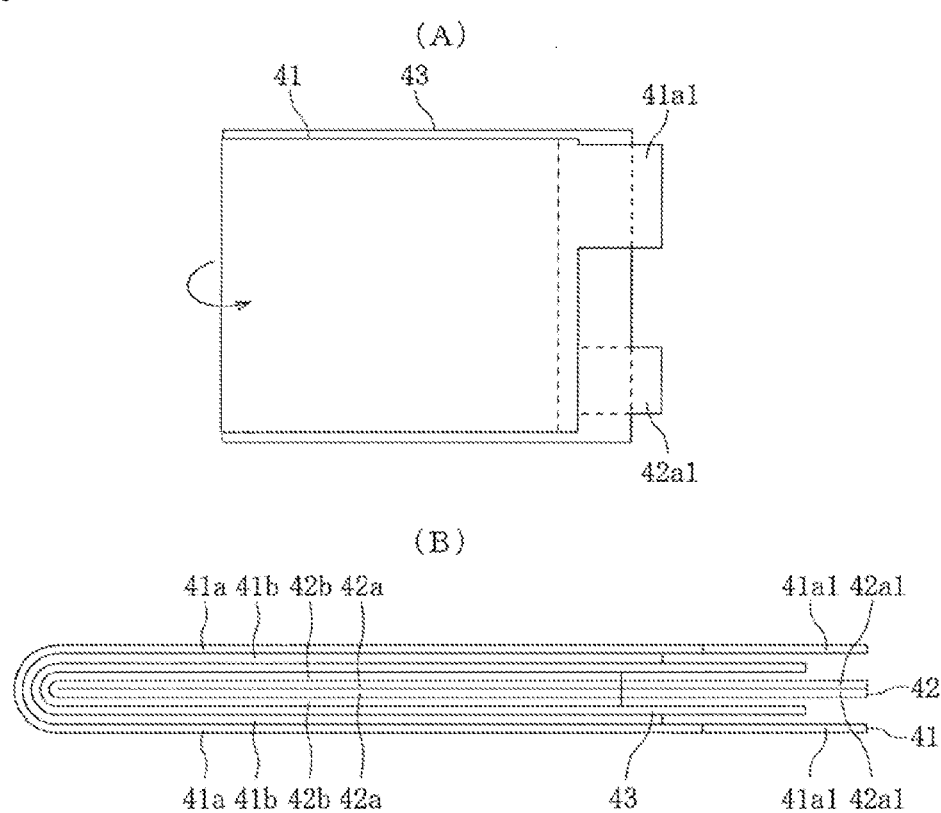
FIG. 23 (A) is a top view showing the laminate in FIG. 22 (A) being folded and superposed, while FIG. 23 (B) is an enlarged left side view of the same.

Next, as shown in FIGS. 23 (A) and (B), the part of the laminate in FIG. 22 (A) on the left side of the center in the longitudinal direction is folded upward along the reference line VSL shown in the drawing, and the left side is superposed with the right side.

At the time of this superposition, the outer peripheries of the lead connection parts 41a1 of the first electrode sheet 41 are caused to align in the superposing direction, while the outer peripheries of the lead connection parts 42a1 of the second electrode sheet 42 are caused to align in the superposing direction.

This way, a folded laminate (no reference numeral) is obtained, which has a configuration in which the first electrode sheet 41, second electrode sheet 42 and separation sheet 43 are folded into two at an angle of approx. 180 degrees over the reference line VSL in such a way that the lead connection parts 41a1 of the first electrode sheet 41 are facing each other and the lead connection parts 42a1 of the second electrode sheet 42 are facing each other.

The next step in this folded laminate shown in FIG. 23 (A) is that, as shown in FIGS. 24 (A) to (C) the mutually facing lead connection parts 41a1 of the first electrode sheet 41 are superposed and two locations on both sides in the lateral direction are directly joined by means of spot-welding, ultrasonic welding, clinching, etc., with the separation sheet 43 in between, to interconnect the lead connection parts 41a1 (refer to the joining location WP11). Also, the mutually facing lead connection parts 42a1 of the second electrode sheet 42 are superposed at positions not contacting the aforementioned lead connection parts 41a1, and two locations on both sides in the lateral direction are directly joined by means of spot-welding, ultrasonic welding, clinching, etc., with the separation sheet 43 in between, to interconnect the lead connection parts 42a1 (refer to the joining location WP11).

Next, as shown in FIG. 24 (A), a lithium sheet 44 for lithium doping is attached, by means of pressure bonding, etc., onto the top surface of the collector electrode layer 41a of the first electrode sheet 41.

This way, the capacitor element 40 is obtained, which has a configuration in which the first electrode sheet 41, second electrode sheet 42 and separation sheet 43 are folded into two at an angle of approx. 180 degrees over the reference line VSL, while the lead connection parts 41a1 of the first electrode sheet 41 are interconnected, and the lead connection parts 42a1 of the second electrode sheet 42 are interconnected.

It should be noted that in FIGS. 18 to 24 (and also in FIG. 25), the thickness of the collector electrode layer 41a and polarizable electrode layer 41b of the first electrode sheet 41, the thickness of the collector electrode layer 42a and polarizable electrode layer 42b of the second electrode sheet 42, and the thickness of the separation sheet 43, have been increased from their actual thicknesses for the convenience of illustration, and therefore the vertical dimensions (overall thicknesses) in FIGS. 22 (B), 23 (B), 24 (B) and 24 (C) appear thicker than they actually are.

However, the thickness of the collector electrode layer 41a and polarizable electrode layer 41b of the first electrode sheet 41, the thickness of the collector electrode layer 42a and each polarizable electrode layer 42b of the second electrode sheet 42, and the thickness of the separation sheet 43, are in a range of 5 to 200 μm and therefore even when the average of all layers is assumed as 60 μm, for example, the actual vertical dimension (overall thickness) in FIG. 22 (B) becomes 300 μm, while the actual vertical dimension (overall thickness) in FIGS. 23 (B), 24 (B) and 24 (C) becomes 600 μm.

In other words, the actual vertical dimension (overall thickness) of the capacitor element 40 shown in FIG. 24 (A) is less than 1000 μm, meaning that, with the folded laminate in FIG. 24 (B), the radius of curvature of the outer surface at the folded location is much smaller than illustrated and consequently the lead connection parts 41a1, 42a1 are virtually not displaced in the longitudinal direction when folded. In addition, the polarizable electrode layers 41b, 42b do not separate from the collector electrode layers 41a, 42a when the laminate is folded, and the polarizable electrode layers 41b, 42b do not lose contact with the separation sheet 43, either. Furthermore, the collector electrode layers 41a, 42a, polarizable electrode layers 41b, 42b and separation sheet 43 have enough flexibility to permit folding and thus do not break at the folded locations.

Also in FIG. 24 (B), the lead connection parts are partially extended for the convenience of illustration, or specifically to explain the connection of lead connection parts 41a1 and connection of lead connection parts 42a1 on the folded laminate. As understood from the foregoing explanation, however, in reality the lead connection parts can be connected without such extensions.

Figure 25:
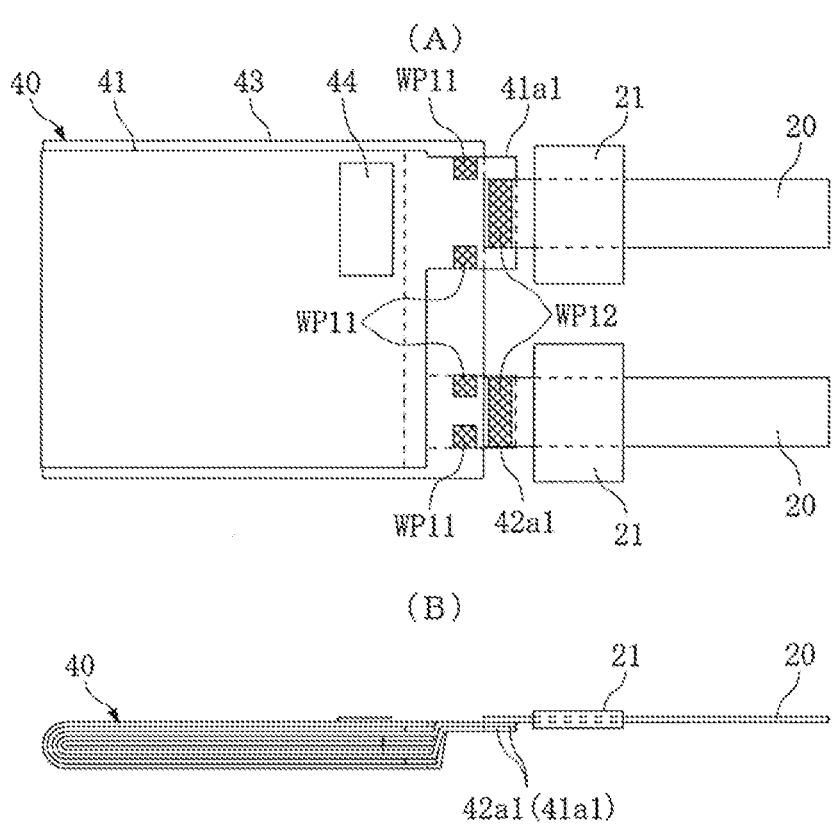
FIG. 25 (A) is a top view showing the capacitor element in FIG. 24 (A) to which leads are connected, while FIG. 25 (B) is a left side view of the same.

Next, FIG. 25 is used to explain the constitution of the lead 20 and how it is connected to the capacitor element 40.

To connect the lead 20 to the capacitor element 40, the lead 20 shown in FIGS. 25 (A) and (B) is prepared. This lead 20 is formed into a short strip shape made of aluminum, platinum, copper or other conductive material, and its thickness is 50 to 100 μm. It should be noted that a metal film may be formed on the surface of the lead 20 at its end by means of electroplating, etc., in order to facilitate connection of the lead 20 to an electrode pad, etc. Also on the surface of the lead 20 in the location corresponding to the front side of a seal area 51c of a package sheet 51 mentioned later, a seal reinforcement material 21 made of the same material as a seal layer LA3 mentioned later is provided so as to surround this location. This seal reinforcement material 21 is formed by sandwiching the lead 20 between two sheets, enclosing the lead 20 with one sheet, or coating a liquid on the surface of the lead 20, among others.

Next, as shown in FIGS. 25 (A) and (B), one end of the lead 20 is placed over the lead connection parts 41a1 connected earlier, at the location projecting from the separation sheet 43, and this end is directly joined, by means of spot-welding, ultrasonic welding, clinching, etc., to connect the lead 20 to the lead connection parts 41a1 connected earlier (refer to the joining location WP12). Also, one end of the other lead 20 is placed over the lead connection parts 42a1 connected earlier, at the location projecting from the separation sheet 43, and this end is directly joined, by means of spot-welding, ultrasonic welding, clinching, etc., to connect the lead to the lead connection parts 42a1 connected earlier (refer to the joining location WP12).

Next, FIGS. 26 to 30 are used to explain the constitution of, and method for creating, the package 50.

Figure 26:
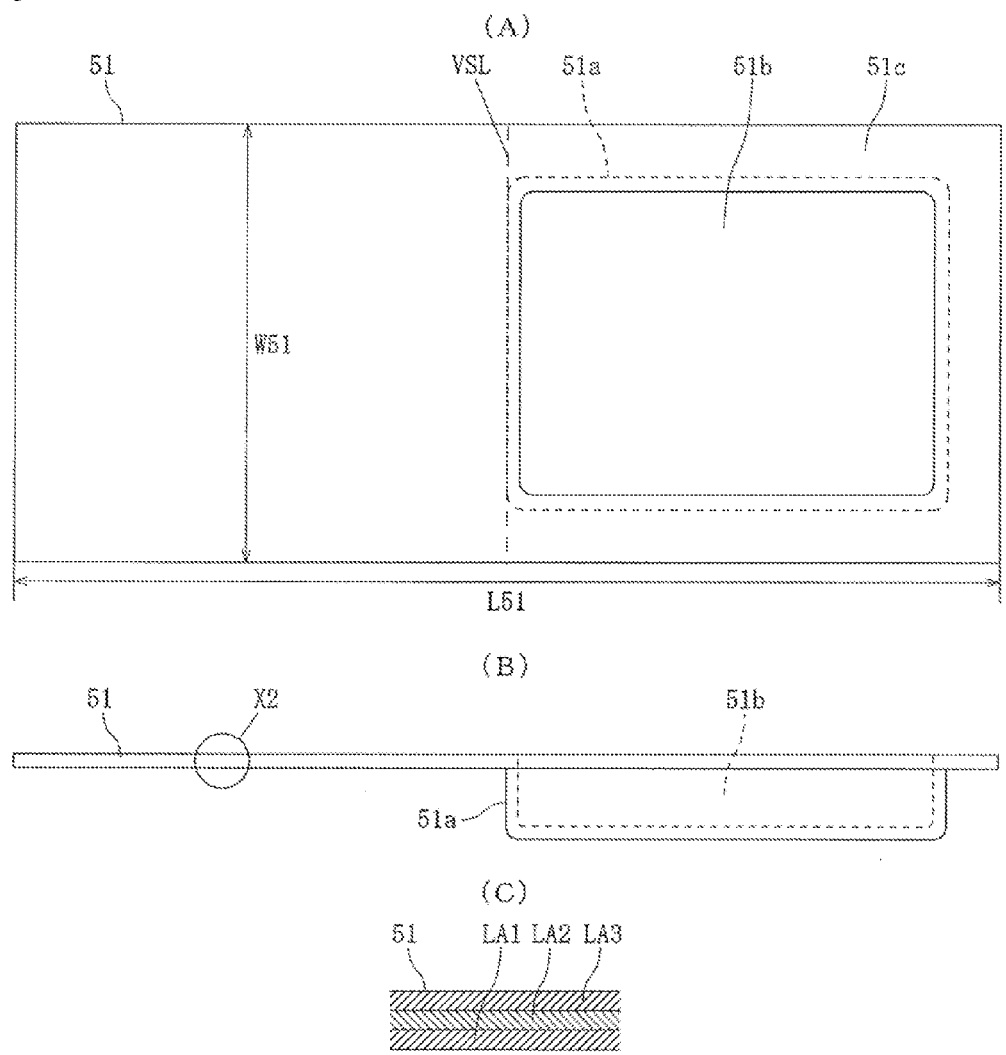
FIG. 26 (A) is a top view of a package sheet, FIG. 26 (B) is a left side view of the same, and FIG. 26 (C) is an enlarged section view of X2 in FIG. 26 (B).

To create the package 50, a package sheet 51 shown in FIGS. 26 (A) to (C) is prepared. As shown in FIG. 26 (C), this package sheet 51 is made of a three-layer laminate film constituted by a protective layer LA1, a barrier layer LA2 and a seal layer LA3 laminated in this order. The protective layer LA1 is made of nylon, polyethylene phthalate or other heat-resistant plastic, and its thickness is 10 to 50 μm. The barrier layer LA2 is made of aluminum or other metal or metal oxide, and its thickness is 10 to 50 μm. The seal layer LA3 is made of polypropylene, modified polypropylene or other thermoplastic, and its thickness is 30 to 50 μm.

As shown in FIGS. 26 (A) and (B), the package sheet 51 forms a rectangular shape of specified longitudinal dimension L51 and lateral dimension W51, and has a rectangular solid overhang 51a on the right side of the center in the longitudinal direction, and provided inside of this overhang is a concaved part 51b of similar shape. The depth of the concaved part 51b is slightly larger than the vertical dimension (overall thickness) of the aforementioned capacitor element 40, and its outline in top view is slightly larger than the outline of the capacitor element 40 in top view. The area of the package sheet 51 on the right side of the center in the longitudinal direction where this concaved part 51*b* does not exist is a seal area 51*c*, and the seal layer LA3 is positioned on the top surface of the package sheet 51.

Figure 17:
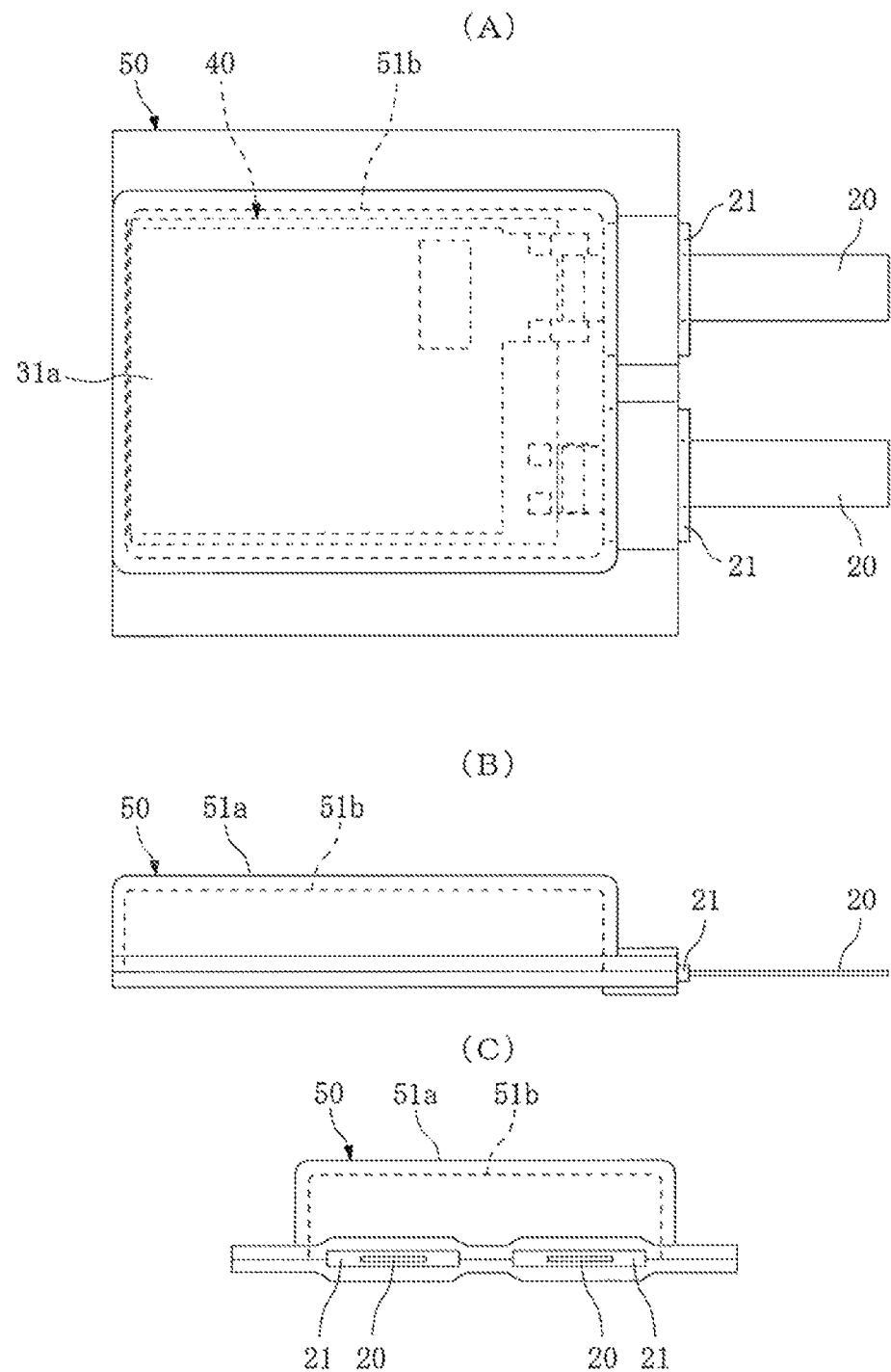
FIG. 17 (A) is a top view of a lithium ion capacitor to which the present invention is applied, FIG. 17 (B) is a left side view of the same, and FIG. 17 (C) is a front view of the same.
Figure 27:
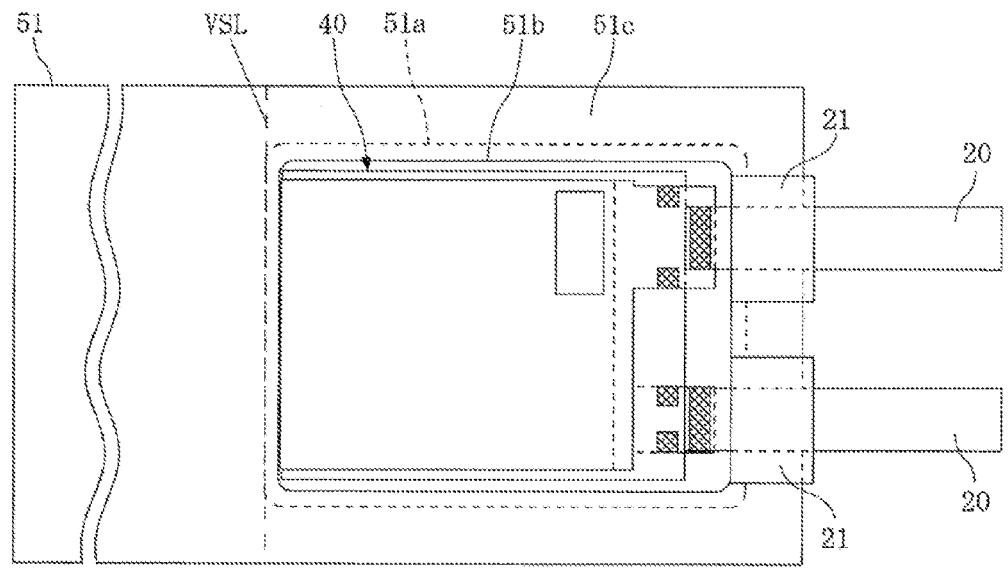
FIG. 27 is a top view showing a capacitor element inserted in a concaved part of a package sheet.

To create the package 50 (refer to FIGS. 17 (A) to (C)), as shown in FIG. 27 the capacitor element 40 of the capacitor element 40 with lead 20 as shown in FIG. 25 (A) is inserted into the concaved part 51*b*, and at the same time the seal reinforcement material 21 of each lead 20 is placed on the front side of the seal area 51*c*. Since the longitudinal dimension of each seal reinforcement material 21 is slightly larger than the longitudinal dimension of the front side of the seal area 51*c*, when inserting the capacitor element 40 into the concaved part 51*b*, the front edge of each seal reinforcement material 21 is caused to project slightly outward from the front edge of the front side of the seal area 51*c*.

Figure 28:
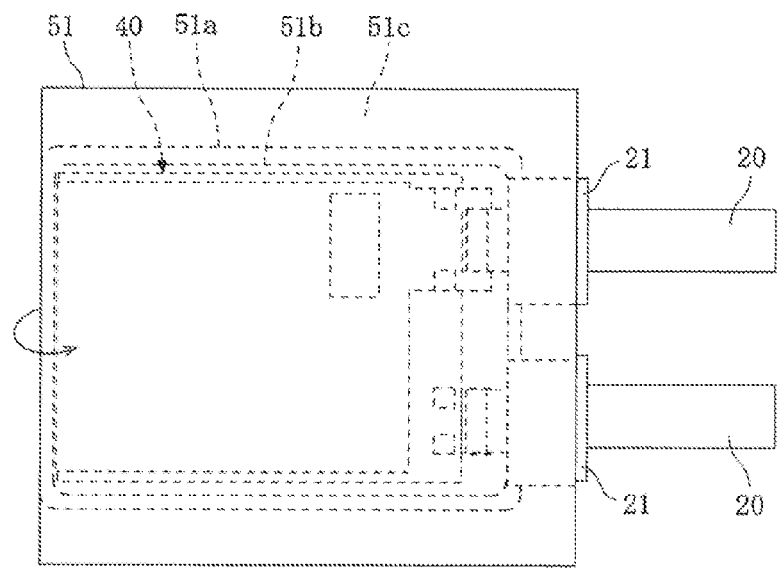
FIG. 28 is a top view showing a package sheet being folded and superposed.

Next, as shown in FIG. 28, the part of the package sheet 51 in FIG. 27 on the left side of the center in the longitudinal direction is folded upward along the reference line VSL shown in the drawing, and the left side is superposed with the right side.

This way, a semi-finished package (no reference numeral) is obtained, which has a configuration in which the seal layer LA3 on the left side of the package sheet 51 is facing the seal layer LA3 in the seal area 51*c* on the right side.

Figure 29:
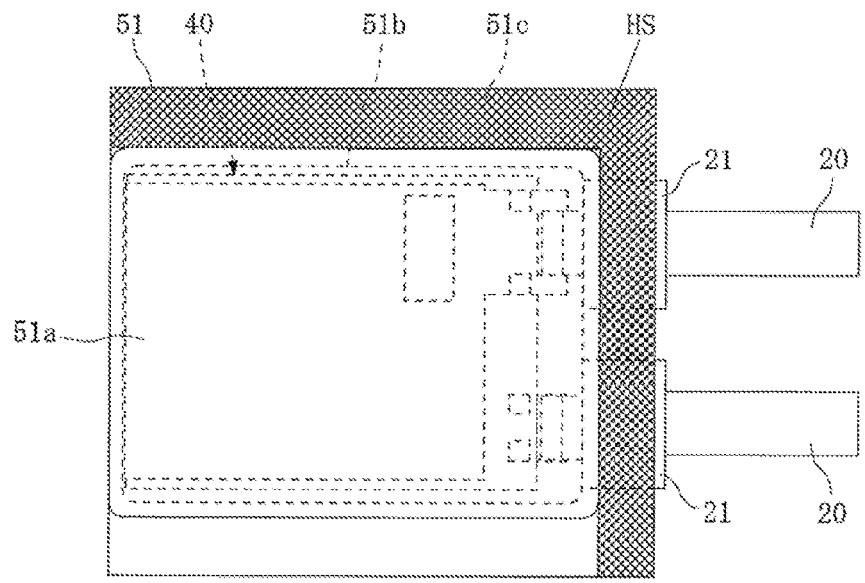
FIG. 29 is a top view showing the semi-finished package in FIG. 28 whose right side and front side are heat-sealed.

Next, as shown in FIG. 29, the semi-finished package shown in FIG. 28 is flipped upside down and heat is applied to the right side to heat-seal the mutually facing seal layers LA3, after which heat is applied to the front side to heat-seal the mutually facing seal layers LA3 by sandwiching each seal reinforcement material 21 in between (refer to the heat-sealing location HS).

Figure 30:
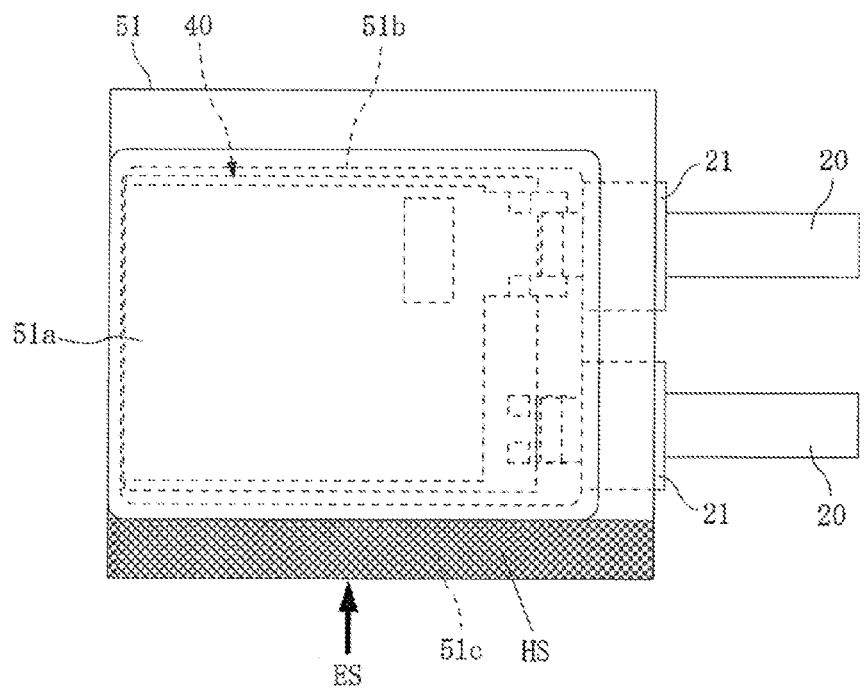
FIG. 30 is a top view showing the semi-finished package in FIG. 29 whose left side is heat-sealed.

Next, as shown in FIG. 30, electrolyte ES (such as a mixture of propylene carbonate (solvent) and lithium hexafluorophosphate (solute)) is injected into the concaved part 51*b* using an appropriate injection implement through the left side of the semi-finished package in FIG. 29 which is not yet heat-sealed. After the electrolyte has been injected, heat is applied to the left side of the seal area 51*c* to heat-seal the mutually facing seal layers LA3 (refer to the heat-sealing location HS).

This way, a lithium ion capacitor structured in such a way that the capacitor element 40 is sealed in the package 50 together with electrolyte ES (refer to FIGS. 17 (A) to (C)) can be obtained.

It should be noted that the seal layer LA3 of the package sheet 51 is not itself significantly thick, so the lead 20 may contact the barrier layer LA2 depending on the melting condition when the front side of the semi-finished package is heat-sealed.

However, heat-sealing the front side of the semi-finished package by sandwiching each seal reinforcement material 21 in between allows the virtual thickness of the seal layer LA3 to be increased by the thickness of each seal reinforcement material 21, as a result of which contact between each lead 20 and the barrier layer LA2 can be prevented in a reliable manner at the time of heat-sealing.

The capacitor element 40 of the aforementioned lithium ion capacitor has a configuration in which the laminate shown in FIG. 22 (A) is folded along the reference line VSL and superposed (refer to FIG. 24 (B)), where the collector electrode layer 41*a* and polarizable electrode layer 41*b* of the first electrode sheet 41, the collector electrode layer 42*a* and polarizable electrode layer 42*b* of the second electrode sheet 42 and the separation sheet 43, are connected to each other via the folded locations. Accordingly, although the layer structure in section view is the same as that of the conventional capacitor element, this capacitor element can have fewer edge areas in the polarizable electrode layers 41*b*, 42*b* compared to the conventional capacitor element.

In other words, the conventional capacitor element is vulnerable to breakage and other damage due to higher density of lines of electric force at the edges of each polarizable electrode layer when voltage is applied to the capacitor element, and therefore presents the risk of problems affecting the capacitor element as a whole, such as a drop in its voltage resistance characteristics and shortening of its life caused by the damage. On the other hand, the aforementioned capacitor element 40 has fewer edge areas in each polarizable electrode layer 41*b*, 42*b* compared to the conventional capacitor element and can therefore effectively suppress the aforementioned damage and reliably suppress problems affecting the capacitor element 40 as a whole, such as a drop in its voltage resistance characteristics and shortening of its life caused by such damage.

Also, with respect to the capacitor element 40 of the aforementioned lithium ion capacitor, it can be considered that the collector electrode layer, polarizable electrode layer, separation sheet, polarizable electrode layer and collector electrode layer constitute one charge/discharge cell, and therefore given the layer structure shown in FIG. 24 (C), this capacitor element 40 appears to have two charge/discharge cells. However, the capacitor element 40 is folded in the manner shown in FIG. 24 (B) and the collector electrode layer 41*a* and polarizable electrode layer 41*b* of the first electrode sheet 41, the collector electrode layer 42*a* and polarizable electrode layer 42*b* of the second electrode sheet 42 and the separation sheet 43 are connected to each other via the folded locations, and accordingly the capacitor element 40 can be expressed by an equivalent circuit where one charge/discharge cell is electrically connected with a pair of leads 20.

In other words, although the layer structure in section view is the same as that of the conventional capacitor element, the number of charge/discharge cells can be reduced by half, meaning that the number of charge/discharge cells can be reduced to limit the range of variation in charge/discharge characteristics. As a result, undesirable effects of varying charge/discharge characteristics, or specifically accumulation of physicochemical damage on certain charge/discharge cells that offer good charge/discharge characteristics and therefore perform more charging/discharging than other cells, where such damage causes the charge/discharge characteristics of the capacitor element as a whole to drop, makes the life of the capacitor element shorter, or presents other problems, can be suppressed in a reliable manner.

Furthermore, the capacitor element 40 of the aforementioned lithium ion capacitor is not only folded in the manner shown in FIG. 24 (B), but it is also such that the lead connection parts 41*a*1 of the first electrode sheet 41 are interconnected via the separation sheet 43, while the lead connection parts 42*a*1 of the second electrode sheet 42 are interconnected via the separation sheet 43.

In other words, the polarizable electrode layer 41*b* of the first electrode sheet 41 positioned at the outermost point of the capacitor element 40 is contacting the separation sheet 43 present on its inside, while this separation sheet 43 is contacting the polarizable electrode layer 42*b* of the second electrode sheet 42, and the foregoing arrangement has the effect that, by interconnecting the lead connection parts 41*a*1 of the first electrode sheet 41 via the separation sheet 43, and also by interconnecting the lead connection parts 42*a*1 of the second electrode sheet 42 via the separation sheet 43, the relative positions of the first electrode sheet 41, the second electrode sheet 42 and the separation sheet 43 constituting the capacitor element 40 can be fixed properly in the longitudinal direction and lateral direction.

In other words, the first electrode sheet 41, second electrode sheet 42 and separation sheet 43 constituting the capacitor element 40 are not easily displaced relative to each other, which has the effect of reliably suppressing deformation of the shape of the capacitor element 40 due to the aforementioned displacement, and consequent deterioration of the charge/discharge characteristics of the element, in the process of manufacturing the lithium ion capacitor, the process of using the manufactured lithium ion capacitor, or the like.

Note that, while not illustrated, anti-displacement projections similar to the anti-displacement projections 11a2, 12a2, 13a2 shown in FIGS. 16 (A) and (B) can be provided on both the outer periphery of the collector electrode layer 41a of the first electrode sheet 41 and the outer periphery of the collector electrode layer 42a of the second electrode sheet 42, or only on the outer periphery of the collector electrode layer 41a of the first electrode sheet 41, to prevent relative displacement of the first electrode sheet 41, the second electrode sheet 42 and the separation sheet 43 in a more reliable manner, which has the effect of more reliably suppressing deformation of the shape of the capacitor element due to the aforementioned displacement, and consequent deterioration of the charge/discharge characteristics of the element, in the process of manufacturing the lithium ion capacitor, the process of using the manufactured lithium ion capacitor, or the like.

Other Embodiments (1) The first embodiment shows constituting the capacitor element 10 by folding and superposing the laminate made by stacking the first electrode sheet 11, separation sheet 14, second electrode sheet 12, separation sheet 14 and third electrode sheet 13 in this order, while the second embodiment shows constituting the capacitor element 10 by folding and superposing the laminate made by stacking the first electrode sheet 41, separation sheet 43 and second electrode sheet 42 in this order, but the number of sheets constituting the laminate before folding may be increased from the number of sheets constituting the laminate shown in the first embodiment (refer to FIG. 7 (B)).

For example, the first electrode sheet 11, the separation sheet 14, the second electrode sheet 12, the separation sheet 14, the electrode sheet identical to the second electrode sheet 12 except that the positions of its lead connection parts 12a1 are changed to the positions of lead connection parts 11a1 of the first electrode sheet 11, the separation sheet 14, and the electrode sheet identical to the third electrode sheet 13 except that the positions of its lead connection parts 13a1 are changed to the positions of lead connection parts 12a1 of the second electrode sheet 12, can be stacked in this order and folded and superposed to constitute a capacitor element having three charge/discharge cells, and this capacitor element can still provide operation and effects similar to the those mentioned above.

(2) An electric double-layer capacitor to which the present invention is applied is shown in the first embodiment, while a lithium ion capacitor to which the present invention is applied is shown in the second embodiment, but the present invention can also be applied to any other electrochemical device having a capacitor element of roughly the same structure, such as a redox capacitor or lithium ion battery, and still provide operation and effects similar to the those mentioned above.

DESCRIPTION OF THE SYMBOLS 10, 10-1, 10-2 - - - Capacitor element, 11 - - - First electrode sheet, 11a - - - Collector electrode layer, 11a1 - - - Lead connection part, 11a2 - - - Anti-displacement projection, 11b - - - Polarizable electrode layer, 12 - - - Second electrode sheet, 12a - - - Collector electrode layer, 12a1 - - - Lead connection part, 12a2 - - - Anti-displacement projection, 12b - - - Polarizable electrode layer, 13 - - - Third electrode sheet, 13a - - - Collector electrode layer, 13a1 - - - Lead connection part, 13a2 - - - Anti-displacement projection, 13b - - - Polarizable electrode layer, 14 - - - Separation sheet, WP1 - - - Joining location, 20 - - - Lead, 21 - - - Seal reinforcement material, WP2 - - - Joining location, 31 - - - Package sheet, 31a - - - Overhang, 31b - - - Concaved part, 31c - - - Seal area, 31d - - - Folded part, HS - - - Heat-sealing location, ES - - - Electrolyte, 40 - - - Capacitor element, 41 - - - First electrode sheet, 41a - - - Collector electrode layer, 41a1 - - - Lead connection part, 41b - - - Polarizable electrode layer, 42 - - - Second electrode sheet, 42a - - - Collector electrode layer, 42a1 - - - Lead connection part, 42b - - - Polarizable electrode layer, 43 - - - Separation sheet, WP11 - - - Joining location, WP12 - - - Joining location, 51 - - - Package sheet, 51a - - - Overhang, 51b - - - Concaved part, 51c - - - Seal area.

What is claimed is:

1. An electrochemical device having a structure wherein a capacitor element is sealed in a package, said capacitor element having a configuration in which two or more electrode sheets, each having a collector electrode layer and a polarizable electrode layer formed on at least one side of the collector electrode layer, are stacked to form a laminate with a separation sheet inserted between the polarizable electrode layers of adjacent different electrode sheets, said laminate being folded along a single common reference line, to be superposed, wherein the collector electrode layers, the polarizable electrode layers, and the separation sheets are continuous through the respective folded locations, and the polarizable electrode layers entirely contact the collector electrode layers and the separation sheets, wherein, of the two or more electrode sheets, provided on both ends of the collector electrode layer of each electrode sheet having one polarity are lead connection parts that face each other in the aforementioned configuration and these lead connection parts are directly joined and are disposed opposite to the folded end of the laminate; and provided on both ends of the collector electrode layer of each electrode sheet having the opposite polarity are lead connection parts that face each other at positions not contacting the lead connection parts of the aforementioned electrode sheet in the aforementioned configuration and these lead connection parts are directly joined and are disposed opposite to the folded end of the laminate, wherein, of the two or more electrode sheets, at least one electrode sheet having one polarity is such that its collector electrode layer has anti-displacement projections on its outer periphery, which anti-displacement projections extend from the outer periphery beyond the adjacent polarizable electrode layer and bite into the adjacent separation sheet without piercing therethrough, and at least one electrode sheet having the opposite polarity is such that its collector electrode layer has anti-displacement projections on its outer periphery, which anti-displacement projections extend from the outer periphery beyond the adjacent polarizable electrode layer and bite into the adjacent separation sheet without piercing therethrough.

2. An electrochemical device according to claim 1, the lead connection parts of the electrode sheet having the one polarity are interconnected via the separation sheet, and the lead connection parts of the electrode sheet having the opposite polarity are interconnected via the separation sheet.

3. An electrochemical device according to claim 2, wherein the laminate comprises:
- as the two or more electrode sheets, a first electrode sheet having a collector electrode layer and a polarizable electrode layer formed on one side of the collector electrode layer;
- a second electrode sheet having a collector electrode layer and polarizable electrode layers formed on both sides of the collector electrode layer;
- a third electrode layer having a collector electrode layer and a polarizable electrode layer formed on the other side of the collector electrode layer; and
- as the separation sheet, two separation sheets;
- wherein, of the two separation sheets, one separation sheet is present between the polarizable electrode layer of the first electrode sheet and one polarizable electrode layer of the second electrode sheet, and the other separation sheet is present between the other polarizable electrode layer of the second electrode sheet and the polarizable electrode layer of the third electrode sheet.

4. An electrochemical device according to claim 2, wherein the laminate comprises:
- as the two or more electrode sheets, a first electrode sheet having a collector electrode layer and a polarizable electrode layer formed on one side of the collector electrode layer;
- a second electrode sheet having a collector electrode layer and a polarizable electrode layer formed on another side of the collector electrode layer; and
- as the separation sheet, a separation sheet;
- wherein the separation sheet is present between the polarizable electrode layer of the first electrode sheet and the polarizable electrode layer of the second electrode sheet.

5. An electrochemical device according to claim 1, wherein the laminate comprises:
- as the two or more electrode sheets, a first electrode sheet having a collector electrode layer and a polarizable electrode layer formed on one side of the collector electrode layer;
- a second electrode sheet having a collector electrode layer and polarizable electrode layers formed on both sides of the collector electrode layer;
- a third electrode layer having a collector electrode layer and a polarizable electrode layer formed on the other side of the collector electrode layer; and
- as the separation sheet, two separation sheets;
- wherein, of the two separation sheets, one separation sheet is present between the polarizable electrode layer of the first electrode sheet and one polarizable electrode layer of the second electrode sheet, and the other separation sheet is present between the other polarizable electrode layer of the second electrode sheet and the polarizable electrode layer of the third electrode sheet.

6. An electrochemical device according to claim 1, wherein the laminate comprises:
- as the two or more electrode sheets, a first electrode sheet having a collector electrode layer and a polarizable electrode layer formed on one side of the collector electrode layer;
- a second electrode sheet having a collector electrode layer and a polarizable electrode layer formed on another side of the collector electrode layer; and
- as the separation sheet, a separation sheet;
- wherein the separation sheet is present between the polarizable electrode layer of the first electrode sheet and the polarizable electrode layer of the second electrode sheet.

7. An electrochemical device according to claim 1, wherein the overall thickness of the laminate is less than 1,000 μm.

8. An electrochemical device having a structure wherein a capacitor element is sealed in a package, said capacitor element having a configuration in which two or more electrode sheets, each having a collector electrode layer and a polarizable electrode layer formed on at least one side of the collector electrode layer, are stacked to form a laminate with a separation sheet inserted between the polarizable electrode layers of adjacent different electrode sheets, said laminate being folded along a reference line, to be superposed, wherein each of the collector electrode layer and polarizable electrode layer constituting each electrode sheet, and the separation sheet, is continuous through the respective folded locations,
- wherein, of the two or more electrode sheets, at least one electrode sheet having one polarity is such that its collector electrode layer has anti-displacement projections on its outer periphery, which anti-displacement projections extend from the outer periphery beyond the adjacent polarizable electrode layer and bite into the adjacent separation sheet without piercing therethrough, and at least one electrode sheet having the opposite polarity is such that its collector electrode layer has anti-displacement projections on its outer periphery, which anti-displacement projections extend from the outer periphery beyond the adjacent polarizable electrode layer and bite into the adjacent separation sheet without piercing therethrough.

9. An electrochemical device according to claim 8,
- wherein, of the two or more electrode sheets, provided on both ends of the collector electrode layer of the electrode sheet having one polarity are lead connection parts that face each other in the aforementioned configuration and these lead connection parts are interconnected;
- and provided on both ends of the collector electrode layer of the electrode sheet having the opposite polarity are lead connection parts that face each other at positions not contacting the lead connection parts of the aforementioned electrode sheet in the aforementioned configuration and these lead connection parts are interconnected.

* * * * *